(12) United States Patent
Chen et al.

(10) Patent No.: US 7,142,135 B1
(45) Date of Patent: Nov. 28, 2006

(54) MODULATION METHODS AND SYSTEMS

(75) Inventors: Hsin-Cheng Chen, Tainan Hsien (TW); Pi-Hai Liu, Taipei (TW); Ming-Yang Chao, Hsin-Chu Hsien (TW)

(73) Assignee: Media Tek Inc., Hsin-Chu Hsien (TW)

( * ) Notice: Subject to any disclaimer, the term of this patent is extended or adjusted under 35 U.S.C. 154(b) by 0 days.

(21) Appl. No.: 11/162,323

(22) Filed: Sep. 6, 2005

(51) Int. Cl.
*H03M 7/00* (2006.01)

(52) U.S. Cl. .......................................... 341/59; 341/50

(58) Field of Classification Search ................... 341/59, 341/58, 50; 369/59.23
See application file for complete search history.

(56) References Cited

U.S. PATENT DOCUMENTS

| | | | |
|---|---|---|---|
| 5,365,231 A | 11/1994 | Niimura | |
| 5,696,505 A | 12/1997 | Schouhamer Immink | |
| 5,731,768 A | 3/1998 | Tsang | |
| 5,742,243 A | 4/1998 | Moriyama | |
| 5,952,944 A | 9/1999 | Nonaka et al. | |
| 6,268,810 B1 | 7/2001 | Shim et al. | |
| 6,297,753 B1 | 10/2001 | Hayami | |
| 6,445,313 B1 | 9/2002 | Ahn | |
| 6,542,452 B1 | 4/2003 | Wu et al. | |
| 6,573,848 B1 | 6/2003 | Hayami | |
| 6,670,896 B1 | 12/2003 | Hayami | |
| 6,690,308 B1 | 2/2004 | Hayami | |
| 6,807,137 B1 | 10/2004 | Chuang | |
| 7,016,286 B1 * | 3/2006 | Hayami et al. ........... 369/59.23 |
| 2002/0118125 A1 * | 8/2002 | Noda et al. .................... 341/58 |
| 2003/0002184 A1 * | 1/2003 | Hayami et al. ................ 360/29 |

* cited by examiner

*Primary Examiner*—Rexford Barnie
*Assistant Examiner*—Joseph Lauture
(74) *Attorney, Agent, or Firm*—Winston Hsu

(57) ABSTRACT

In a high-density optical storage system, data words are modulated into code words in a manner of minimizing the fluctuation of the digital sum value (DSV). A cumulative DSV is calculated for each possible value of a DSV control bit. The DSV control bit is determined to minimize the absolute cumulative DSV when detecting at least one subsequent DSV control bit or after a predetermined delay. A corresponding code word is generated according to the determined current DSV control bit.

42 Claims, 26 Drawing Sheets

| Data word | State 0 | | State 1 | | State 2 | |
|---|---|---|---|---|---|---|
| | Code word | Next state | Code word | Next state | Code word | Next state |
| 00 | 100010 00000* | 0 | 010100 01000* | 0 | 010100 01000* | 0 |
| 01 | 100010 00000# | 1 | 010100 010001 | 1 | 010100 010001 | 1 |
| 02 | 100010 000010 | 0 | 010100 010010 | 0 | 010100 010010 | 0 |
| 03 | 100010 000010 | 1 | 010100 010010 | 1 | 010100 010010 | 1 |
| 04 | 100010 10000* | 0 | 010100 01010* | 0 | 010100 01010* | 0 |
| 05 | 100010 10000# | 1 | 010100 010101 | 1 | 010100 010101 | 1 |
| 06 | 100010 100010 | 0 | 010100 010100 | 2 | 010100 010100 | 2 |
| ⋮ | ⋮ | ⋮ | ⋮ | ⋮ | ⋮ | ⋮ |

Fig. 3

| Data word | State 0 | | | State 1 | | | State 2 | | |
|---|---|---|---|---|---|---|---|---|---|
| | $PSD_0$ | $PSD_1$ | $ID_{DSV}$ | $PSD_0$ | $PSD_1$ | $ID_{DSV}$ | $PSD_0$ | $PSD_1$ | $ID_{DSV}$ |
| 00 | 4 | 2 | 0 | -2 | 0 | 0 | -2 | 0 | 0 |
| 01 | 4 | 2 | 1 | 0 | 0 | 0 | 0 | 0 | 0 |
| 02 | 0 | 0 | 0 | 2 | 2 | 0 | 2 | 2 | 0 |
| 03 | 0 | 0 | 0 | 2 | 2 | 0 | 2 | 2 | 0 |
| 04 | -8 | -6 | 0 | 4 | 2 | 0 | 4 | 2 | 0 |
| 05 | -8 | -6 | 1 | 2 | 2 | 0 | 2 | 2 | 0 |
| 06 | -4 | -4 | 0 | 4 | 4 | 0 | 4 | 4 | 0 |
| ... | ... | ... | ... | ... | ... | ... | ... | ... | ... |

Fig. 12

| Data word | Partial DSV |
|---|---|
| 00 00 00 00 | 2 |
| 00 00 10 00 | 0 |
| 00 00 00 | 5 |
| 00 00 01 | -1 |
| 00 00 10 | -3 |
| 00 00 11 | 3 |
| 00 01 | 0 |
| 00 10 | -4 |
| 00 11 | 2 |
| 01 | -1 |
| 10 | 1 |
| 11 | 3 preceding data word = 10<br>3 preceding data word = even number of 11<br>-1 preceding code word = odd number of 11 |

Fig. 16

| Data word | Code word | |
|---|---|---|
| 00 00 00 00 | 010 100 100 100 | |
| 00 00 10 00 | 000 100 100 100 | |
| 00 00 00 | 010 100 000 | |
| 00 00 01 | 010 100 100 | |
| 00 00 10 | 000 100 000 | |
| 00 00 11 | 000 100 100 | |
| 00 01 | 000 100 | |
| 00 10 | 010 000 | |
| 00 11 | 010 100 | |
| 01 | 010 | |
| 10 | 001 | |
| 11 | 000 | preceding code word = xx1 |
|  | 101 | preceding code word = xx0 |

Fig. 17

MODULATION METHODS AND SYSTEMS

BACKGROUND OF THE INVENTION

1. Field of the Invention

The present invention relates to modulation methods and systems for recording digital data on an information medium such as an optical disc, more particularly to modulation methods and systems for minimizing a cumulative digital sum value (DSV) for high-density optical storage systems.

2. Description of the Prior Art

Prior to transmission or recording of digital data, the digital data is usually converted to another data pattern through a certain modulation method. In compact disc (CD) recording systems, the data to be recorded on a compact disc is modulated using EFM (eight-to-fourteen modulation), whereas the data to be recorded on a digital versatile disc (DVD) is modulated using EFM+ (eight-to-sixteen modulation). However, during the process of EFM or EFM+ modulation, it is important to keep the DSV value as close to zero as possible to allow reliable tracking and reliable detection of high frequency signals. Therefore, there were several methods proposed for keeping the absolute value of the DSV as low as possible to suppress DC (direct current) content during a modulation procedure. In advanced optical discs such as Blu-ray disc (BD), and high density DVD (HD-DVD), to improve the ability of suppressing DC (direct current) content during the modulation procedure, DC (DSV) control bits are included in 17 PP modulation for BD and eight-to-twelve modulation for HD-DVD. By controlling the values of DC control bits, the absolute value of the cumulative DSV could be kept as low as possible to suppress DC content during the modulation procedure.

FIG. 1 shows a functional block diagram of an 8–16 (EFM+) modulation system for transforming 8-bit data word B(t) into 16-bit code words X(t). During the modulation procedure, each 8-bit data word B(t) associated with a current state S(t) is converted to a main code word $X_m(t)$ having 16 channel bits and a main next state $S_m(t+1)$ through a main conversion table 11. If the data word B(t) is less than eighty-eight, a comparator 13 enables a substitution conversion table 12 to simultaneously output a sub code word $X_s(t)$ and a sub next state $S_s(t+1)$. Meanwhile, a DSV controller 14 is also enabled to calculate a DSV corresponding to each of the main and sub code words, and select one of the code words to be the output code word X(t). The code word X(t) is selected so as to minimize the absolute value of the cumulative DSV. If the main code word $X_m(t)$ is selected as the code word X(t), the main next state $S_m(t+1)$ is designated as the next state S(t+1). The next state S(t+1) is temporarily stored in the state register 15. Similarly, if the sub code word $X_s(t)$ is selected as the code word X(t), the sub next state $S_s(t+1)$ is designated as the next state S(t+1). For DVD modulation, a code word X(t) is obtained through the aforesaid conversion tables 11 and 12 when a data word B(t) and the corresponding current state S(t) are known. The code word X(t) is independent from subsequent data word B(t+1).

During the modulation process for a high density optical storage system such as HD-DVD, Blu-ray, or AOD system, a modulation code word is obtained after determination of the DSV control bit. A DSV control bit may not exist in each data word, and ideally, the determination of the DSV control bits should depend upon all the data words so that the overall cumulative DSV is kept to the minimum. Consequently, a large number of registers is required for storing data words or code words during the modulation process, which also result in a long latency delay.

SUMMARY OF THE INVENTION

Modulation methods and systems for recording digital data on an optical storage medium are provided. A DSV control bit is determined before, after, or while converting the data words into codes words, and the determined DSV control bit is used to modify the DSV control bit of a corresponding code word. Embodiments of the modulation method and system are capable of reducing the required buffer capacity, and keeping a constant latency for determining code words.

The DSV control bit is determined when detecting at least one subsequent DSV control bit so as to suppress DC (direct current) content of the signal during modulation.

A plurality of data words is modulated into code words, and DSV control bits are determined in order to keep the DC content of the signal as low as possible. A cumulative digital sum value (DSV) is calculated for each possible value of a DSV control bit. The DSV control bit is determined for minimizing the absolute cumulative DSV when one or more subsequent DSV control bit is detected or after a predetermined delay. The determined DSV control bit is then used to modify the DSV control bit of the corresponding code word.

In some other embodiments, a plurality of words is buffered according to a specific format for determining DSV control bits. A cumulative digital sum value (DSV) is calculated from the buffered words for each possible value of a DSV control bit. The DSV control bit is determined for minimizing the absolute cumulative DSV when at least one subsequent DSV control bit is detected or after a predetermined delay. The determined DSV control bit is then combined with the corresponding buffered word for modulation.

In some other embodiments, a modulation system comprises an encoder and a DSV controller. The encoder modulates data words into code words. The DSV controller includes a DSV control bit generator determining a DSV control bit, and a final code word generator inserts, updates, or modifies the determined DSV control bit in the corresponding code word. In some other embodiments, code words corresponding to both possible values of the DSV control bit are generated, and the final code word generator selects one of the code words according to the determined DSV control bit. The DSV control bit generator calculates a cumulative DSV for each possible value corresponding to the DSV control bit, and determines the DSV control bit to minimize an absolute cumulative DSV when detecting at least one subsequent DSV control bit or after a predetermined delay. A DSV control bit buffer stores the determined DSV control bits generated from the DSV control bit generator, and the final code word generator generates the code words according to the DSV control bit output from the DSV control bit buffer.

In some other embodiments, a modulation system comprises a storage device for buffering a plurality of words of a specific format and a digital sum value (DSV) controller. The DSV controller comprises a DSV control bit generator for calculating a cumulative DSV for each possible value of a DSV control bit and for determining the DSV control bit which minimizes an absolute cumulative DSV when detecting at least one subsequent DSV control bit or after a predetermined delay. The words of the specific format may be data words, final code words, or tentative code words, where the tentative code words are generated from the data words during modulation, and are used for generating the final code words. A final code word generator inserts, modifies, or updates the DSV control bit in the buffered words according to the determined DSV control bit.

In some embodiments, a system for DSV control bit determination comprises a data word to partial DSV transferring circuit, a DSV accumulator, and a DSV control bit generator. The data word to partial DSV transferring circuit generates partial DSV according to data words, and the DSV accumulator cumulates the partial DSVs as cumulative DSVs for possible values of a DSV control bit. The DSV control bit generator determines the value of a DSV control bit according to the cumulative DSVs.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 3 expresses an example of a portion of the code conversation table shown in FIG. 2.

FIG. 12 shows a portion of an exemplary partial DSV table.

FIG. 16 represents an example of a so-called mapping table that converts data words to partial DSVs.

FIG. 17 shows an example implementation of the encoder shown in FIG. 14 for the conversion from data word to code word.

DETAILED DESCRIPTION

Figure 1:
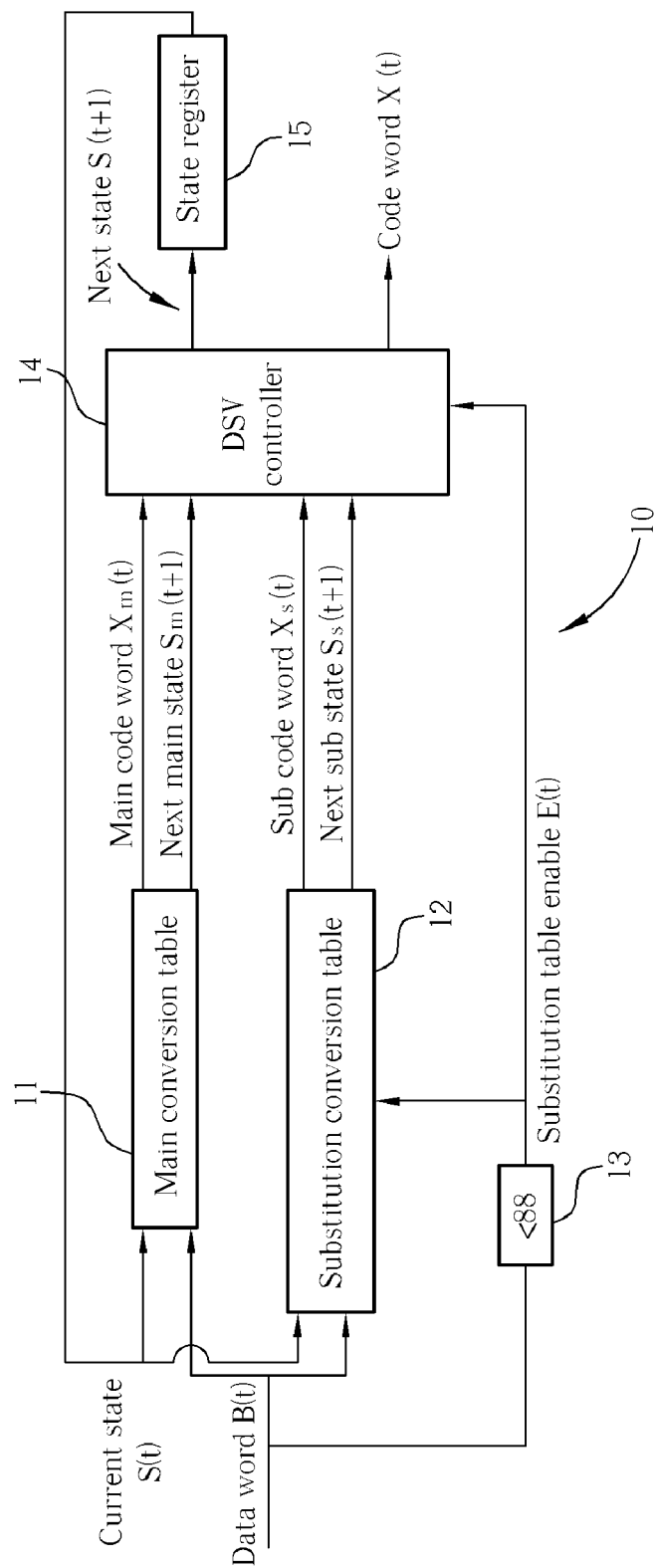
FIG. 1 shows a functional block diagram for EFM+ modulation.
Figure 2:
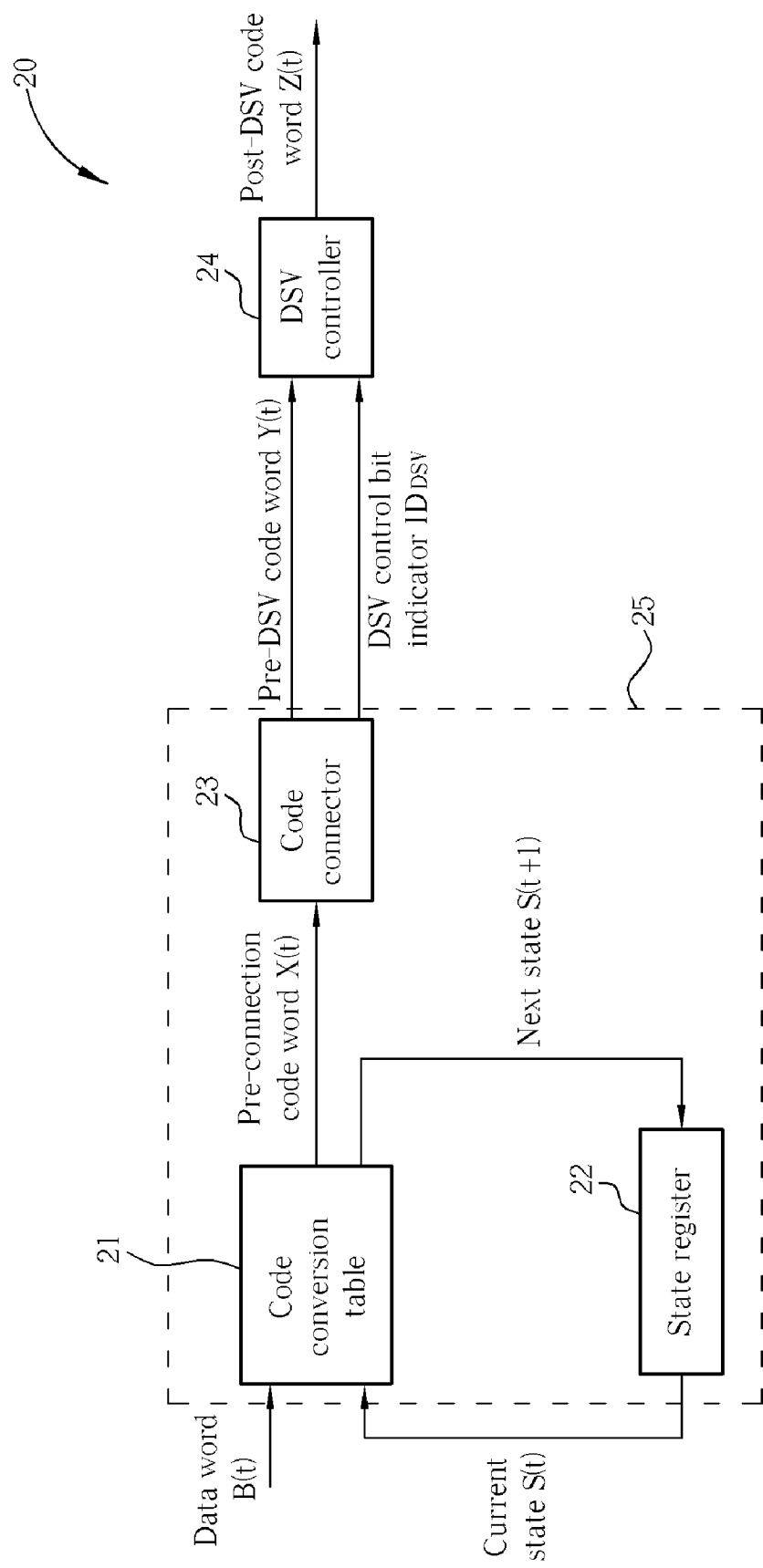
FIG. 2 is a functional block diagram showing an embodiment of a modulation system.

FIG. 2 is a block diagram showing an embodiment of a modulation system 20 in a high-density recording system. For example, in an HD-DVD recording system, 8-bit data words will be transformed into 12-bit code words through a modulation system 20 as shown in FIG. 2, and the 12-bit code words is for recording on an optical disc. During the modulation procedure, the 8-bit data word B(t) associated with a current state S(t) read from a state register 22 is converted to a pre-connection word X(t) through a conversion table 21, and in the meanwhile, a next state S(t+1) is also derived and stored in the state register 22. FIG. 3 expresses an example of a portion of the code conversation table 21. Concatenation rules for code words should be applied to connect the pre-connection code words X(t) derived from the conversion table 21. If adjoining pre-connection code words X(t) fit in some specific patterns, these pre-connection code words X(t) should be modified by a code connector 23. The code connector 23 generates and outputs pre-DSV code words Y(t), and if a pre-connection code word X(t) includes a DSV control bit, it also outputs a DSV control bit indicator $ID_{DSV}$ to a DSV controller 24. The DSV controller 24 determines the value of a current DSV control bit which minimizes the absolute cumulative DSV when it detects a subsequent DSV control bit from the code connector 23 or after a predetermined delay, and generate a post-DSV code word Z(t) according to the corresponding pre-DSV code word Y(t) and the determined current DSV control bit to achieve a minimized absolute cumulative DSV. The post-DSV code word Z(t) may be generated by modifying, inserting, or updating the corresponding pre-DSV code word Y(t) according to the determined current DSV control bit. Another way to generate the post-DSV code word Z(t) is to generate more than one possible code words corresponding to the corresponding pre-DSV code word Y(t). Z(t) is selected from one of the possible code words corresponding to the determined current DSV control bit. The conversion table 21, state register 22, and code connector 23 act as an encoder 25. In some embodiments, the timing for the DSV controller 24 to determine the value of the current DSV control bit may not depend upon the detection of the subsequent DSV control bit. The DSV controller 24 may wait until a second, a third, or a fourth subsequent DSV control bit has arrived, and then determine the current DSV control bit which minimizes the absolute cumulative DSV. It is also possible that the DSV controller 24 may determines more than one DSV control bit at a time. In some other embodiments such as a Blu-ray system, the current DSV control bit may be determined before the arrival of the subsequent DSV control bit.

Figure 4:
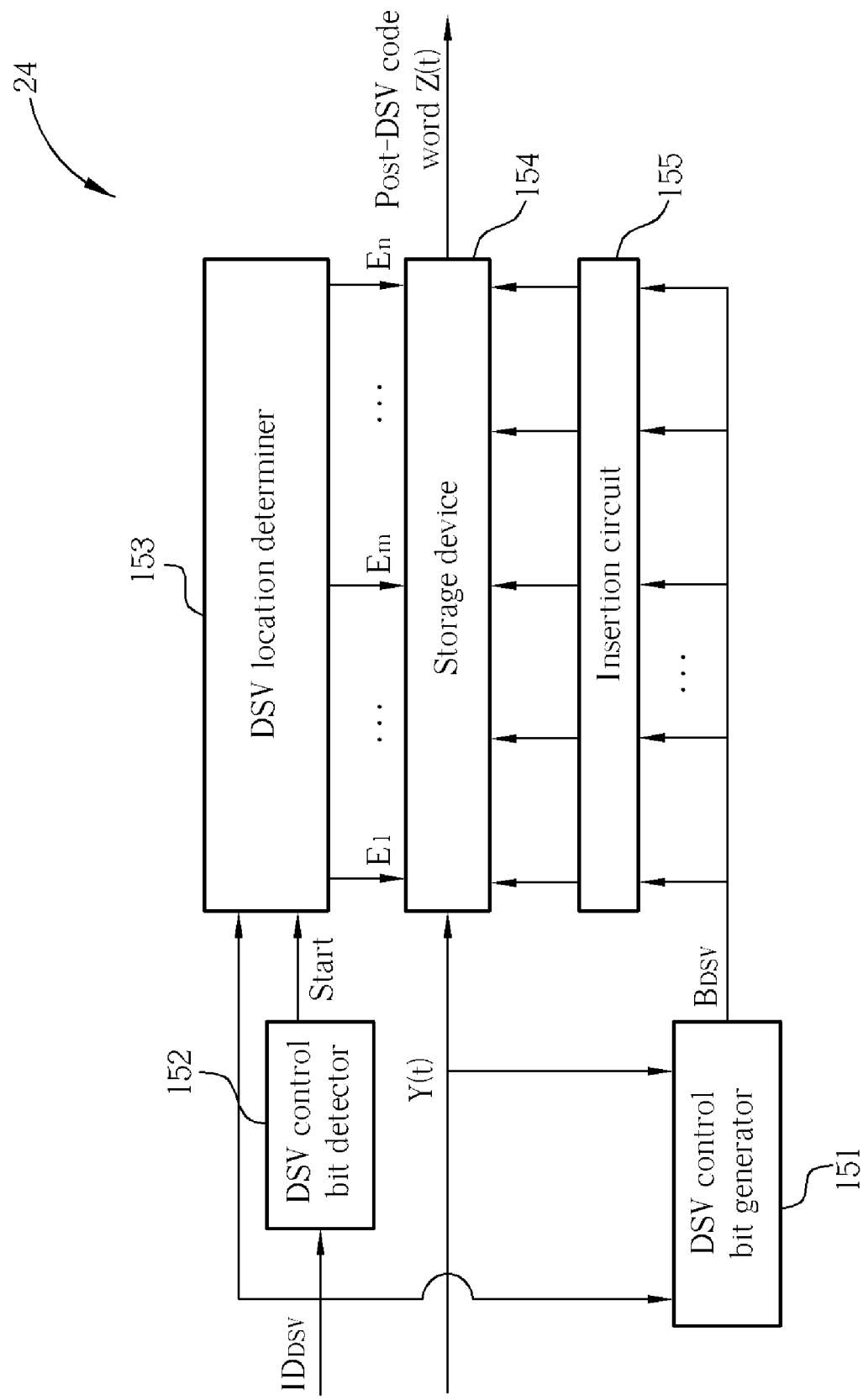
FIG. 4 is a functional block diagram showing an embodiment of the DSV controller in FIG. 2.

FIG. 4 shows an embodiment of the DSV controller 24, the DSV controller 24 includes a DSV control bit generator 151, a DSV control bit detector 152, a DSV location determiner 153, a storage device 154, and an insertion circuit 155. The DSV control bit generator 151 calculates a cumulative DSV for each possible value corresponding to a current control bit, and determines the current DSV control bit $B_{DSV}$ that minimizes the cumulative DSV. The DSV control bit detector 152 detects whether any DSV control bit exists in the current code word according to the DSV control bit indicator $ID_{DSV}$. When a DSV control bit is detected, the DSV control bit detector 152 notifies the DSV location determiner 153. The storage device 154 stores each of the pre-DSV code words Y(t) generated by the code connector. In some embodiments, the storage device 154 comprises a series of pipe registers, delay registers, or shift registers, wherein each register stores one of the pre-DSV code word Y(t). In some other embodiments, the storage device 154 may be a first-in first-out (FIFO) memory, or a random access memory (RAM) with a write/read address generator. The number of registers is preferably greater than or equal to the maximum number of code words (or data words) between the occurrences of two consecutive DSV control bits. In an embodiment, the maximum number of code words between two consecutive DSV control bits may be the number of words in one frame, for example, 93 words, and it may be the number of words in two frames if considering that the DSV control bit in the frame sync field is used for ROPC (read optimum power calibration). The pre-DSV code words Y(t) are sequentially piped in the storage device

154. The DSV location determiner 153 records the location of each code word having a DSV control bit. For example, the DSV location determiner 153 keeps tracking the storage location of the code word having a first DSV control bit until receiving the code word having a second DSV control bit. When the DSV location determiner 153 receives a DSV control bit indicator $ID_{DSV}$ indicating the arrival of the second DSV control bit, it sends an enabling signal ($E_1$, $E_2$, ..., $E_n$) to a register of the storage device 154 storing the code word having the first DSV control bit. If the code word having the first DSV control bit is currently stored in the $m^{th}$ register of the storage device 154, the DSV location determiner 153 outputs the enabling signal $E_m$ to instruct the storage device 154 to allow the insertion of the determined current DSV control bit from the insertion circuit 155 to the $m^{th}$ register. By analogy, the second DSV control bit is determined and inserted into the corresponding register of the storage device 154 when the DSV location determiner 153 receives a DSV control bit indicator $ID_{DSV}$ indicating the arrival of the third DSV control bit, and so on. In this way, a DSV control bit is determined and inserted into the corresponding register of the storage device 154 when the DSV location determiner 153 receives a DSV control bit indicator $ID_{DSV}$ indicating the arrival of the subsequent DSV control bit. Instead of inserting a single DSV control bit into a code word, a code word might have two DSV control bits. In this case, it would be necessary to keep track of the individual bits within the code word to control the insertion of the two DSV control bits. In some other embodiments, the DSV control bits originally existed in the code words or data words are default values or arbitrary values, which will be modified in accordance to the determined DSV control bits generated by the DSV control bit generator. In some other embodiments, the digital words corresponding to the possible DSV control bits values are stored in the registers, then one of the digital words is selected in accordance to the determined DSV control bits generated by the DSV control bit generator. The digital words may be data words, final code words, or tentative code words, where the tentative code words are generated from the data words during modulation, and are used for generating the final code words.

Figure 5:
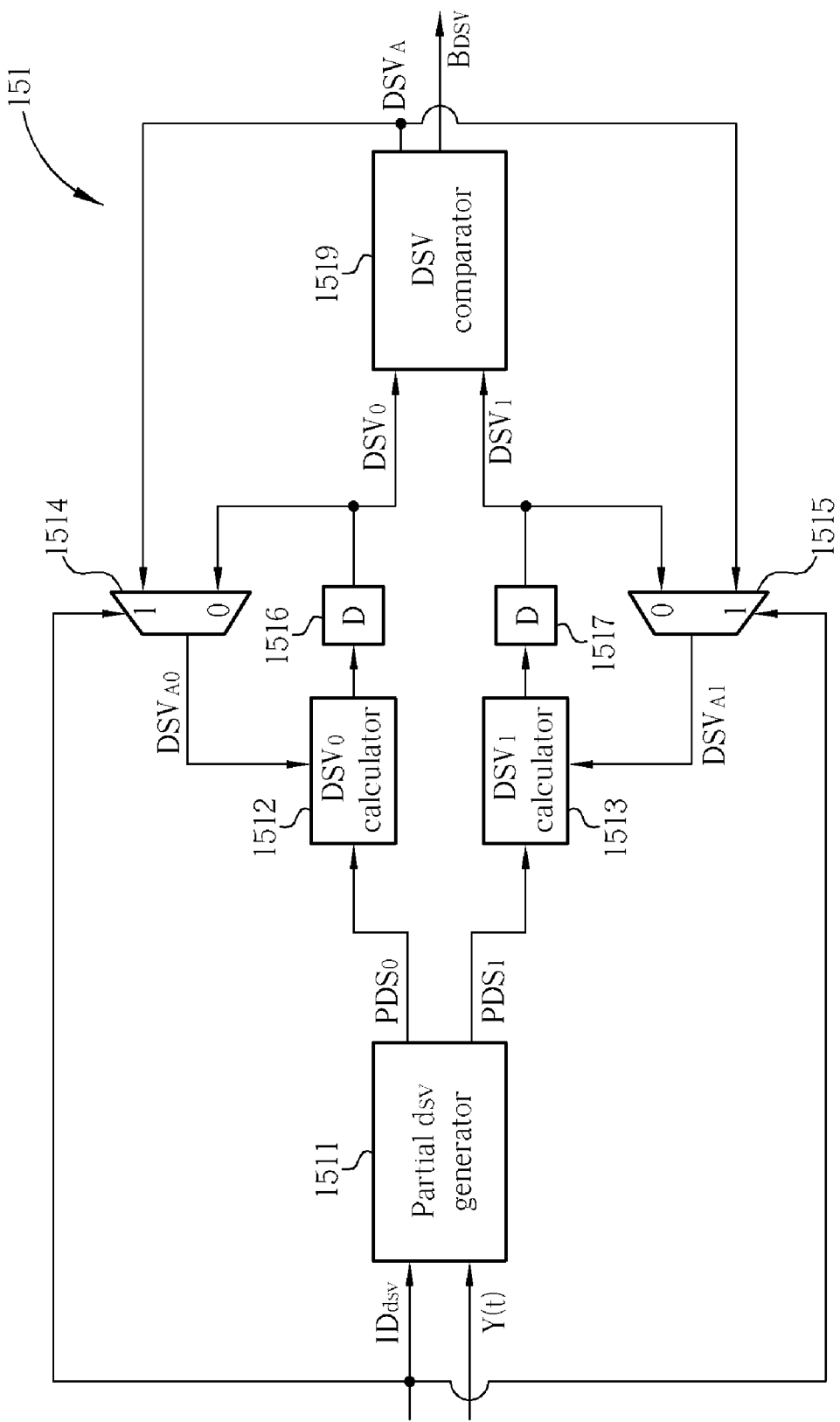
FIG. 5 is a functional block diagram showing an embodiment of the DSV control bit generator in FIG. 4.

FIG. 5 is a block diagram showing an embodiment of the DSV control bit generator 151 in FIG. 4. Because a DSV control bit has two possible values, 0 and 1, the DSV control bit generator 151 determines the value which minimizes the absolute cumulative DSV. A partial DSV generator 1511 simultaneously generates two partial DSVs, $PSD_0$ and $PSD_1$, according to a tentative code word Y(t). If the tentative code word Y(t) does not have any DSV control bit, the two partial DSVs, $PSD_0$ and $PSD_1$, generated by the partial DSV generator 1511 are the same. If the tentative code word Y(t) has a DSV control bit as indicated by $ID_{DSV}$, the two partial DSVs, $PSD_0$ (assuming the current DSV control bit $B_{DSV}=0$) and $PSD_1$ (assuming the current DSV control bit $B_{DSV}=1$), are generated by the partial DSV generator 1511, respectively. The $DSV_0$ calculator 1512 adds the partial DSV $PSD_0$ to the cumulative DSV $DSV_{A0}$, or substrates the partial DSV $PSD_0$ from the cumulative DSV $DSVA_0$ according to the polarity of the cumulative DSV $DSV_{A0}$. When the subsequent tentative code word Y(t) output from the code connector 23 does not have any DSV control bit, the cumulative DSV $DSV_{A0}$ is selected from the value stored in the corresponding register 1516. After calculation, the value calculated by the $DSV_0$ calculator 1512 is stored in the register 1516 to update the original stored value. In the same manner, the $DSV_1$ calculator 1513 adds the partial DSV $PSD_1$ to the cumulative DSV $DSV_{A1}$, or substrates the partial DSV $PSD_1$ from the cumulative DSV $DSV_{A1}$ according to the polarity of the cumulative DSV $DSV_{A1}$. When the subsequent tentative code word Y(t) output from the code connector 23 does not have any DSV control bit, the cumulative DSV $DSV_{A1}$ is selected from the value stored in the corresponding register 1517. The value calculated by the $DSV_1$ calculator 1513 is then stored in the register 1517. When a subsequent DSV control bit is detected as indicated by $ID_{DSV}$, the DSV comparator 1519 compares the cumulative DSVs $DSV_0$ and $DSV_1$ and chooses the minimum absolute value among which as the updated cumulative $DSV_A$. Besides, the DSV comparator 1519 also designates the bit value corresponding to a minimum absolute value as the value of the current DSV control bit $B_{DSV}$. Meanwhile, the two multiplexes, 1514 and 1515, select the updated cumulative $DSV_A$ as the cumulative DSVs of the two branches, that is, $DSV_{A0}$ and $DSV_{A1}$ for cumulative DSV calculations in the $DSV_0$ calculator 1512 and $DSV_1$ calculator 1513. After cumulative DSV calculation, the values calculated by the $DSV_0$ calculator 1512 and $DSV_1$ calculator 1513 are stored to the corresponding registers 1516 and 1517 as the newly updated cumulative DSVs. In this way, a DSV control bit could be determined by comparing the two branches of cumulative DSV calculations when a subsequent DSV control bit is detected.

Figure 6:
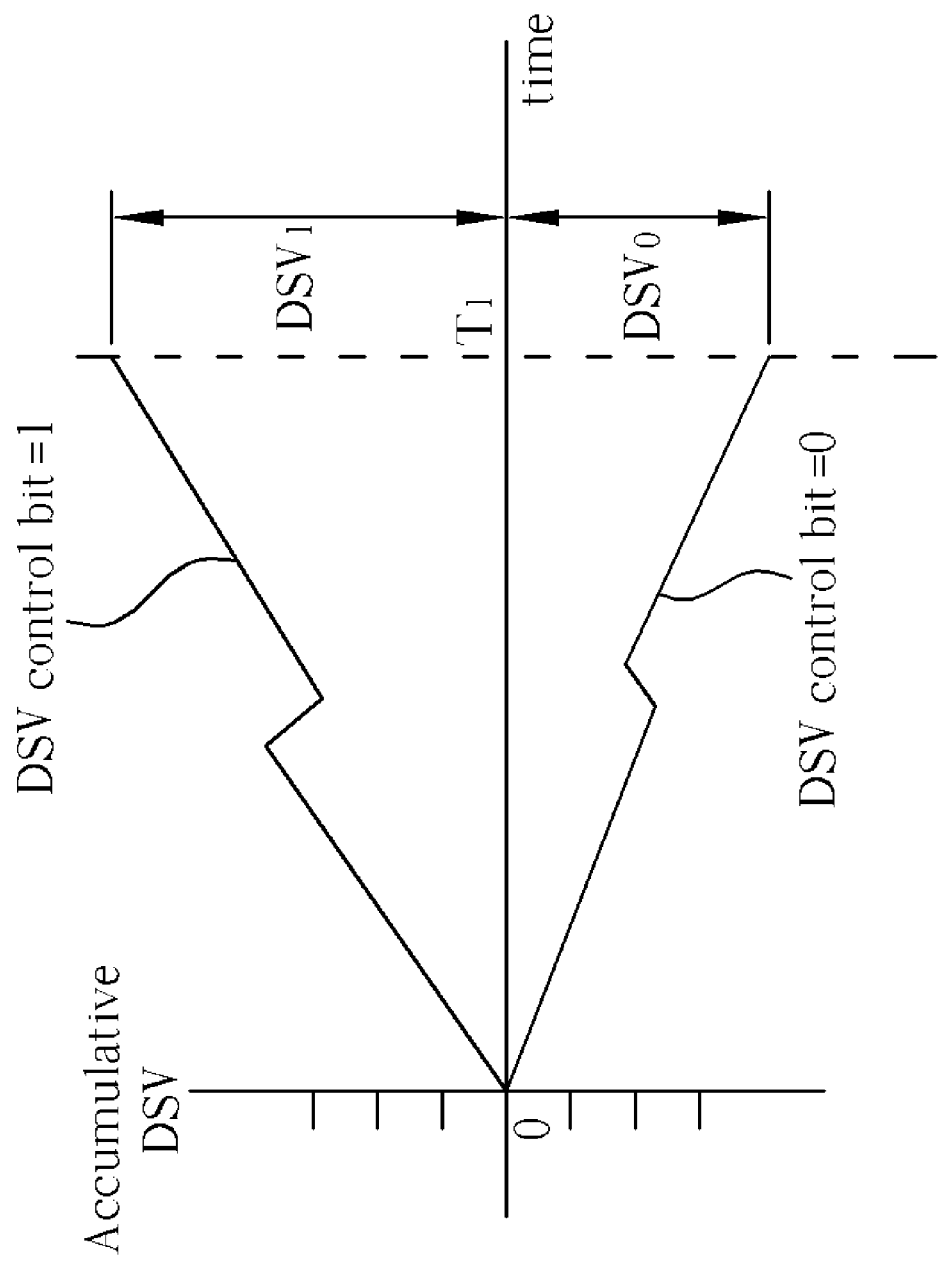
FIGS. 6–7 are graphs illustrating cumulative DSV calculation.

As shown in the example of FIG. 6, the current DSV control bit is determined by comparing two possible values corresponding to the current DSV control bit, which are absolute cumulative DSVs $DSV_0$ and $DSV_1$, when detecting a subsequent DSV control bit at time $T_1$. In some other embodiments, time $T_1$, the timing for comparing the cumulative DSVs, may be a constant predetermined interval. In the example of FIG. 6, $DSV_0$ is smaller than $DSV_1$ at time $T_1$, and hence the current DSV control bit is selected as 0.

Figure 7:
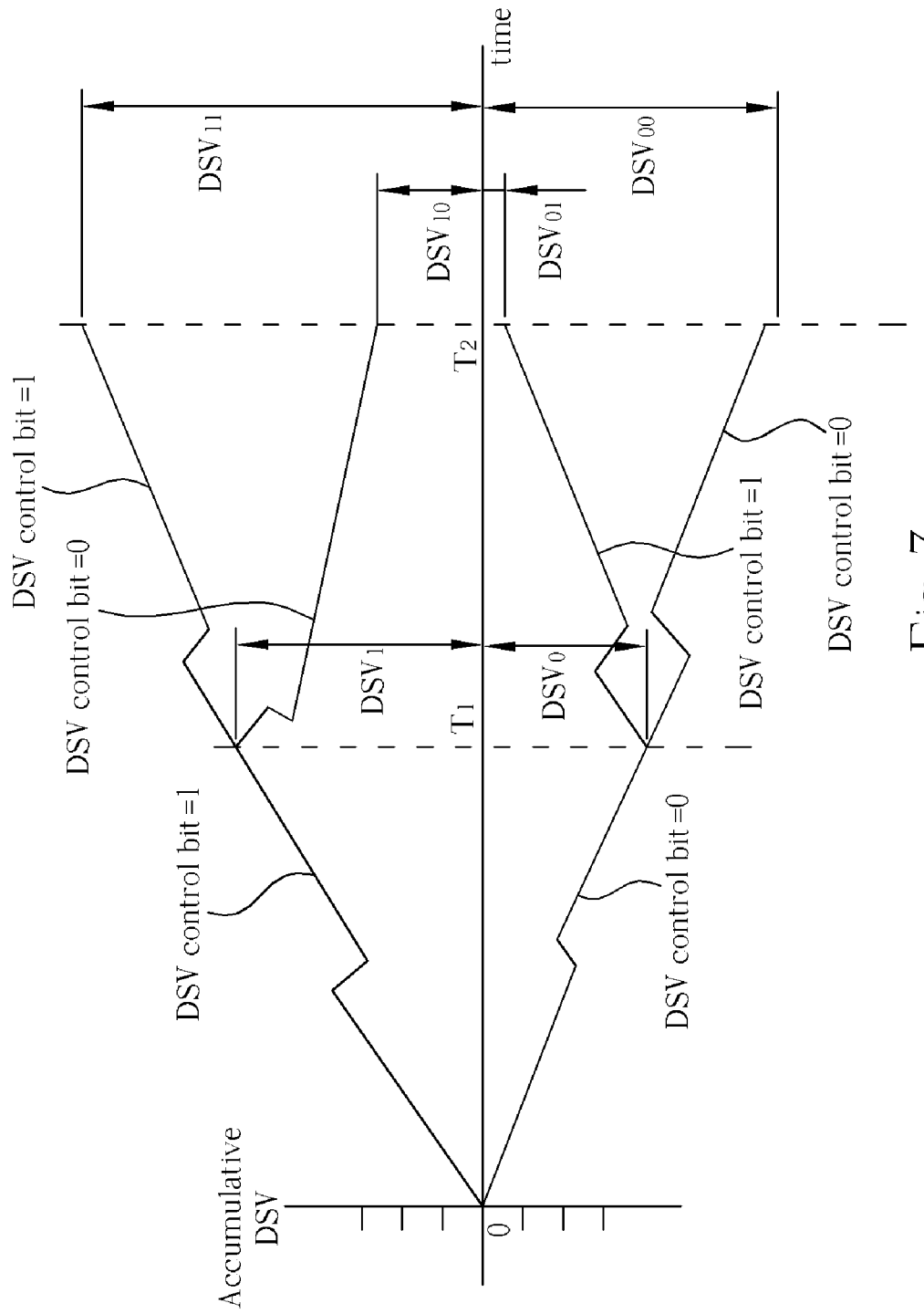

Moreover, the current DSV control bit can be determined when two subsequent DSV control bits are detected, as shown in the example of FIG. 7. The current DSV control bit is not determined when the first subsequent DSV control bit is detected at time $T_1$. Each of the cumulative DSVs is split into two branches after time $T_1$. When the second subsequent DSV control bit is detected at time $T_2$, the DSV comparator 1519 determines the current DSV control bit by comparing the four possible values corresponding to both the current and first subsequent DSV control bits, which are the absolute cumulative DSVs, $DSV_{00}$, $DSV_{01}$, $DSV_{10}$, and $DSV_{11}$, or in some embodiments, both the current and subsequent DSV control bits can be determined accordingly. In this example, $PSD_{01}$ is the minimum out of the four absolute cumulative DSVs, and hence the current DSV control bit is designated as 0.

Figure 8:
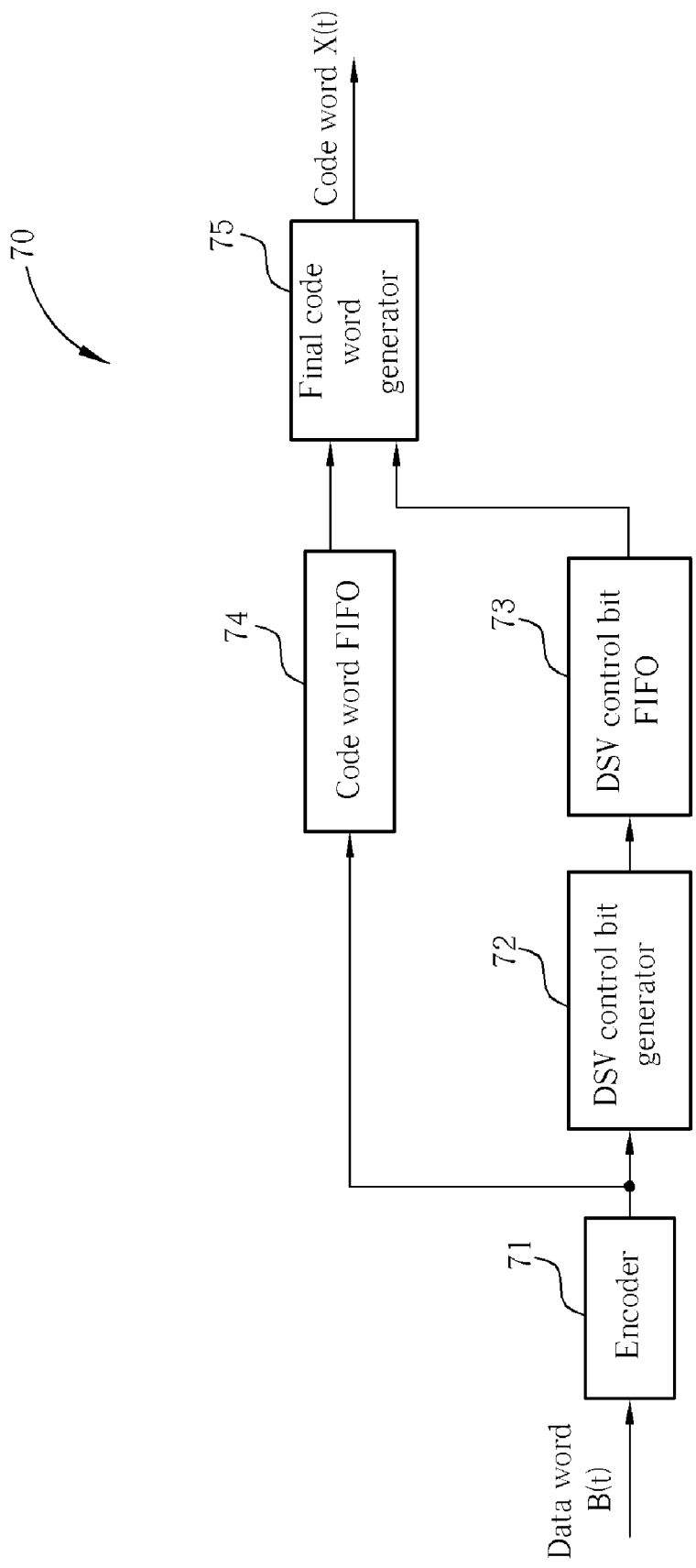
FIGS. 8–10 are functional block diagrams showing embodiments of modulation systems.
Figure 8A:
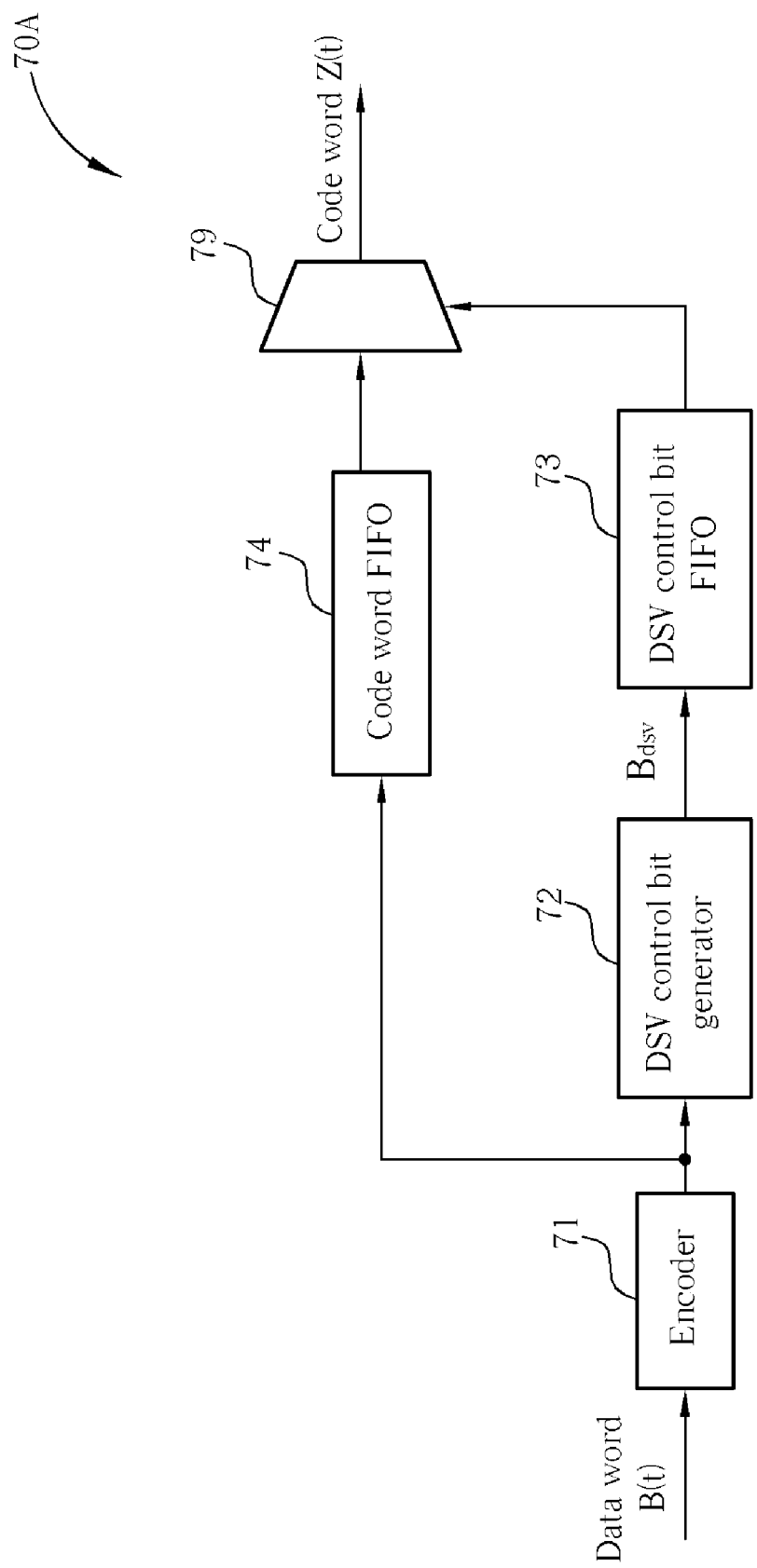

FIG. 8 shows another embodiment of a modulation system 70. In this embodiment, a DSV control bit generator 72 determines the DSV control bits according to tentative code words encoded by an encoder 71. The tentative code words are sequentially stored in a code word FIFO 74. A final code word generator 75 inserts the determined DSV control bits sequentially stored in a DSV bit FIFO 73 into corresponding code words read from the code word FIFO 74. In some other embodiments, the final code word generator 75 modifies the original DSV control bit of the tentative code words with the DSV control bit stored in the DSV control bit FIFO 73.

Figure 9:
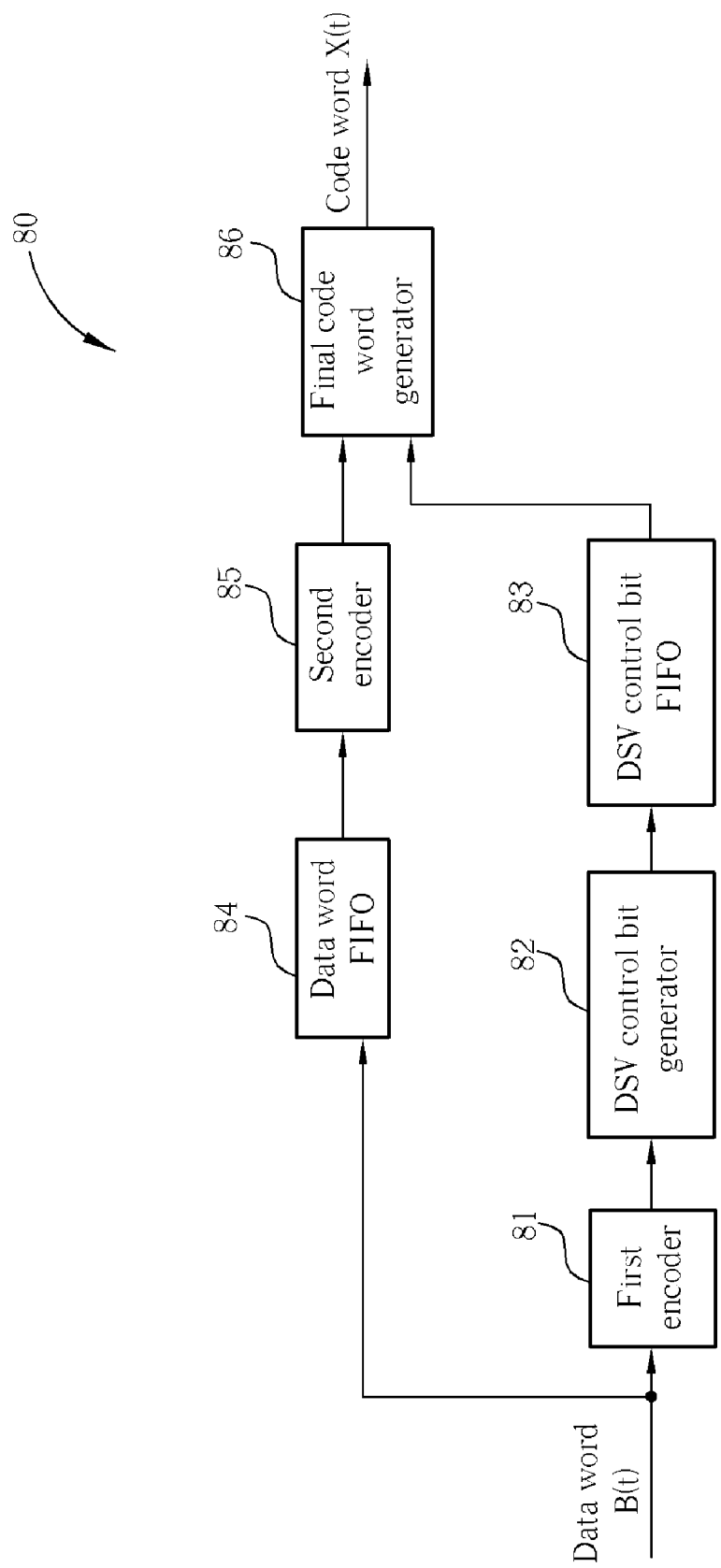
Figure 9A:
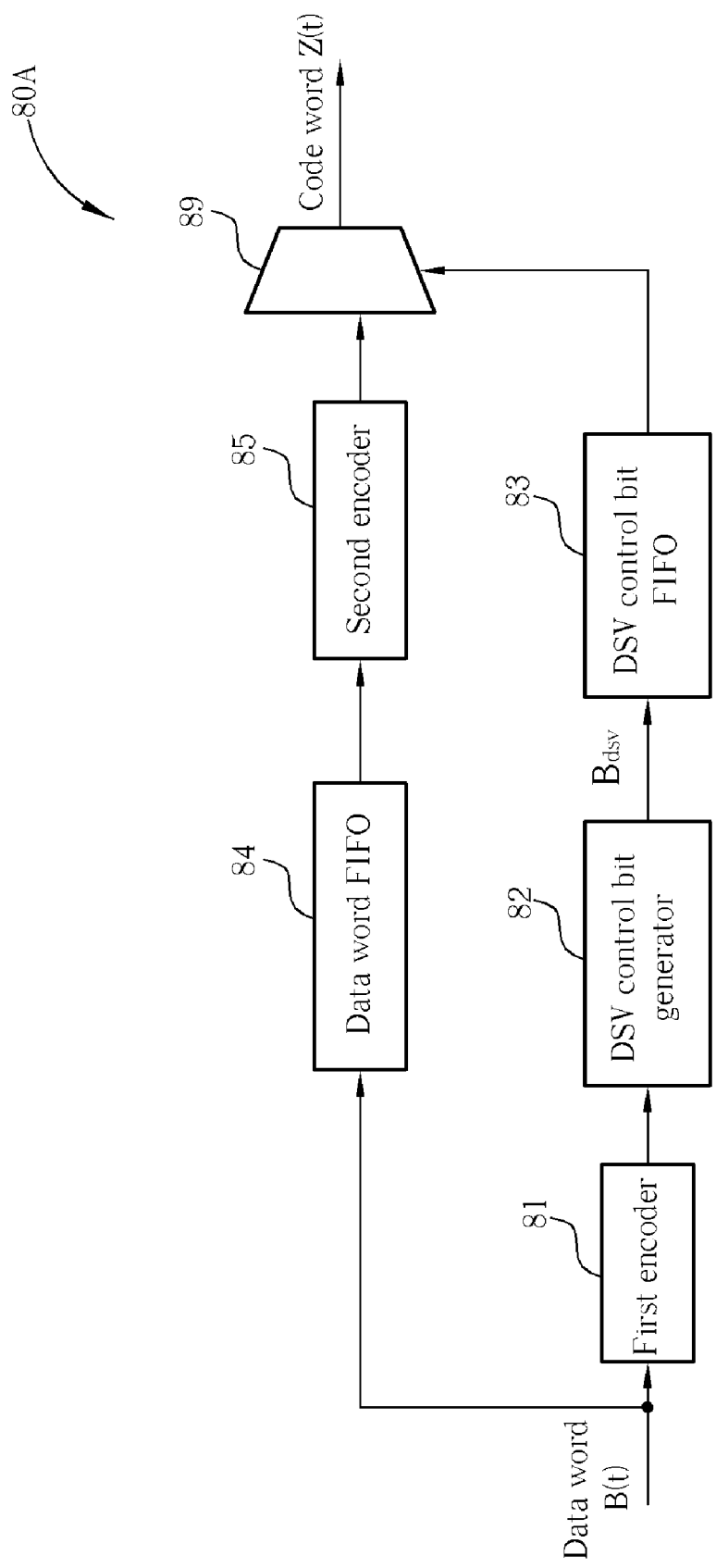

In comparison with the modulation system 70, the modulation system 80 in FIG. 9 further comprises a second encoder 85, so that the buffer 84 may store data words instead of code words, consequently, reducing the memory size required by the data word FIFO 84. The capacity for storing data words is less than the capacity for storing code words, for example, in an HD-DVD recording system, there are eight bits in a data word, but twelve bits in a code word. A DSV control bit generator 82 determines DSV control bits according to tentative code words encoded by a first encoder 81, and outputs the determined DSV control bits to a DSV bit FIFO 83. The second encoder 85 modulates the data words stored in the data word FIFO 84 into tentative code words. The determined DSV control bits output from the DSV control bit FIFO 83 are combined into corresponding tentative code words by a final code word generator 86.

Since the input of the DSV control bit generator 72 in the modulation system 70 and the input of the DSV control bit generator 82 in the modulation system 80 are tentative code words Y(t), which is the same as that in modulation system 20, one embodiment of the DSV control bit generator 72 and the DSV control bit generator 82 could be the same as the DSV control bit generator 151 in the modulation system 20 as shown in FIG. 5.

Figure 10:
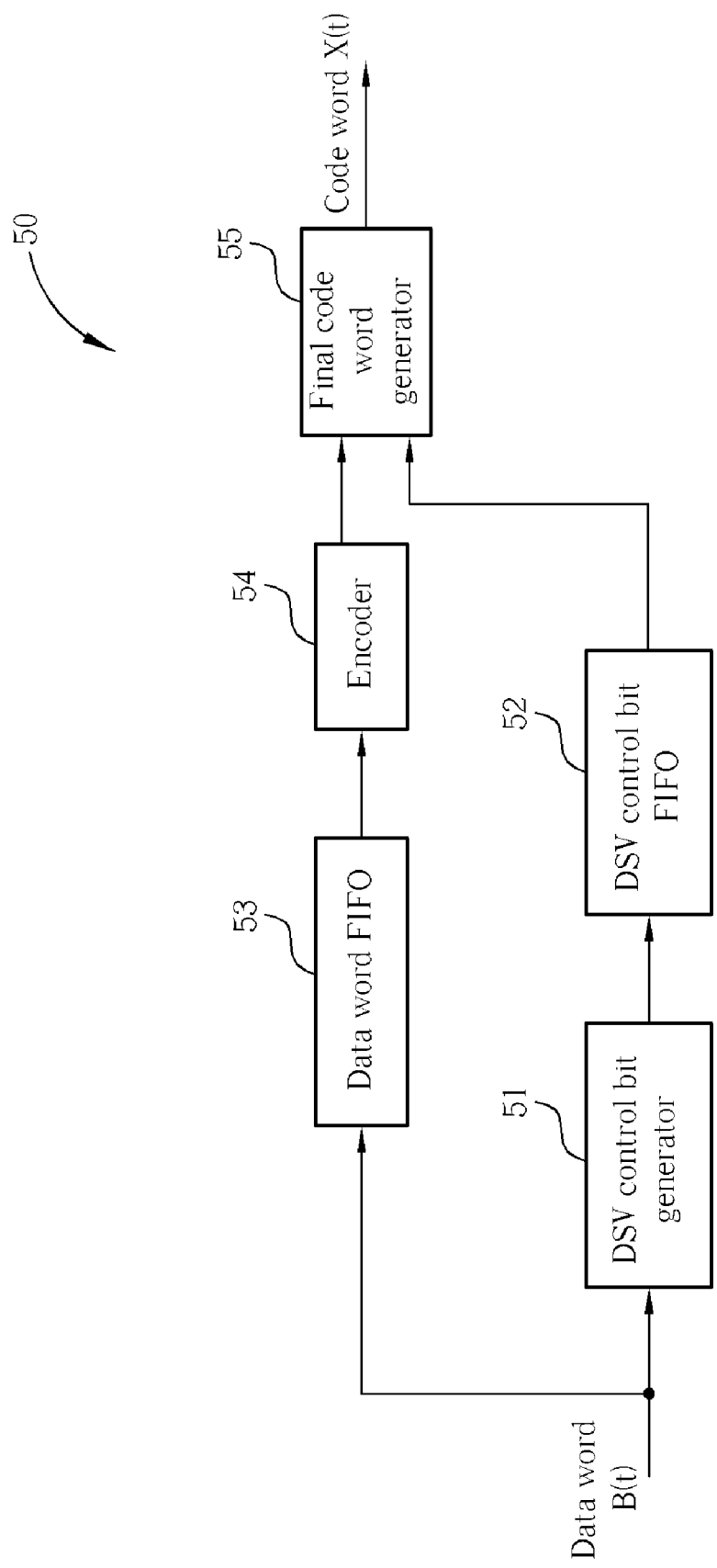
Figure 10A:
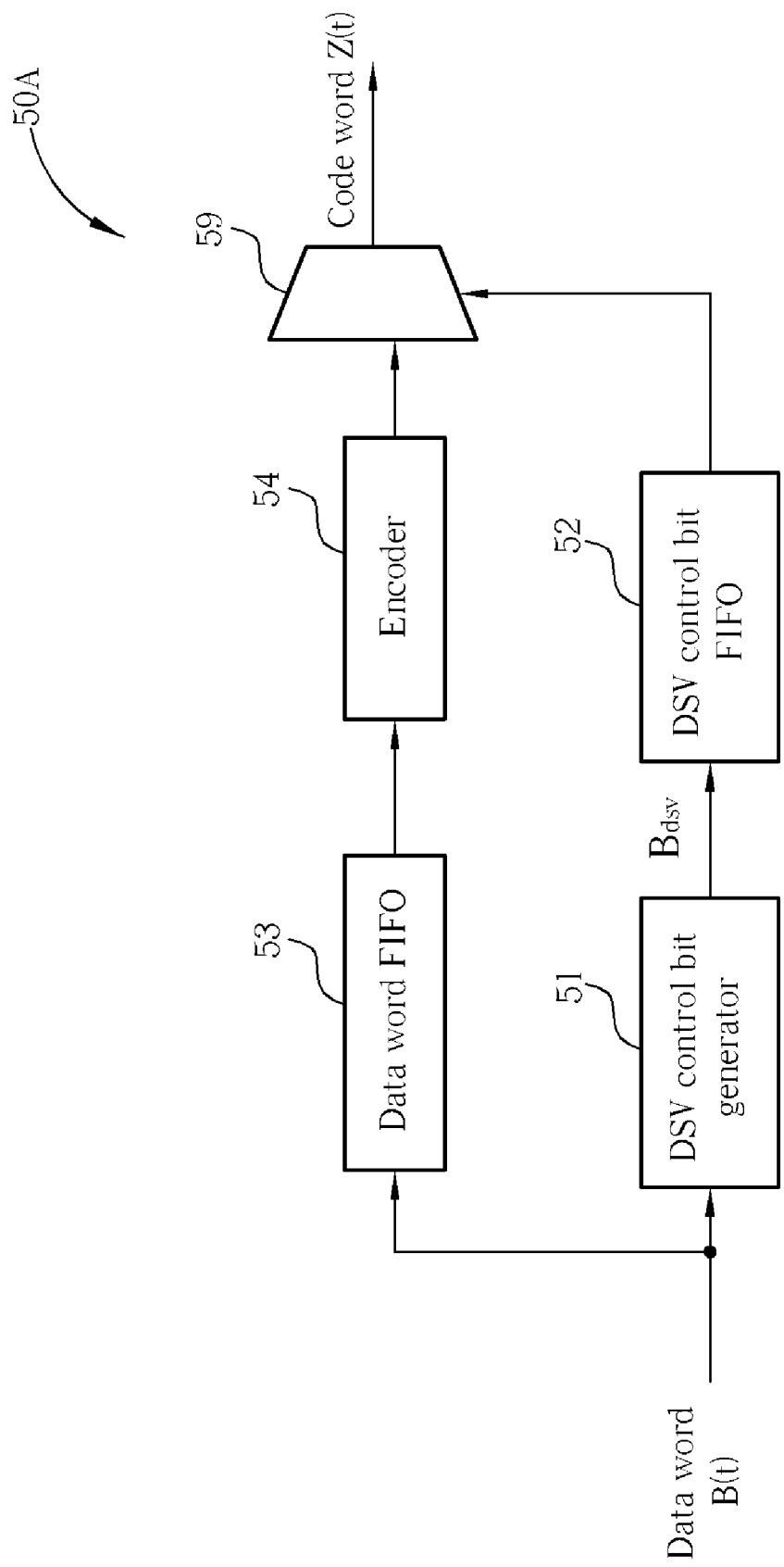

FIG. 10 is a block diagram showing an embodiment of a modulation system 50. Data words B(t) are provided to a DSV control bit generator 51 and a data word FIFO 53. By utilizing the data word FIFO 53 to store data words B(t) instead of code words, the buffer size of the data word FIFO 53 is reduced. The data word FIFO 53 then provides the data words B(t) to an encoder 54 to transform the data words into code words with undetermined DSV control bits, or so called tentative code words. The DSV control bit generator 51 determines a current DSV control bit to minimize the absolute cumulative DSV when detecting at least one subsequent DSV control bit. The determined current DSV control bit is temporarily stored in a DSV control bit FIFO 52, and then is read out from the DSV control bit FIFO 52. A final code word generator 55 modifies the DSV control bit in the tentative code word according to the current DSV control bit stored in the DSV control bit FIFO 52. By storing the DSV control bit in the DSV control bit FIFO 52, the DSV control bit can be accessed and controlled more easily. In other embodiments, the DSV control bit generator 51 can also use a mapping table to determine the DSV control bit based on the data word. By using a mapping table, the cumulative DSV can be calculated by searching for corresponding values using the data words.

Figure 11:
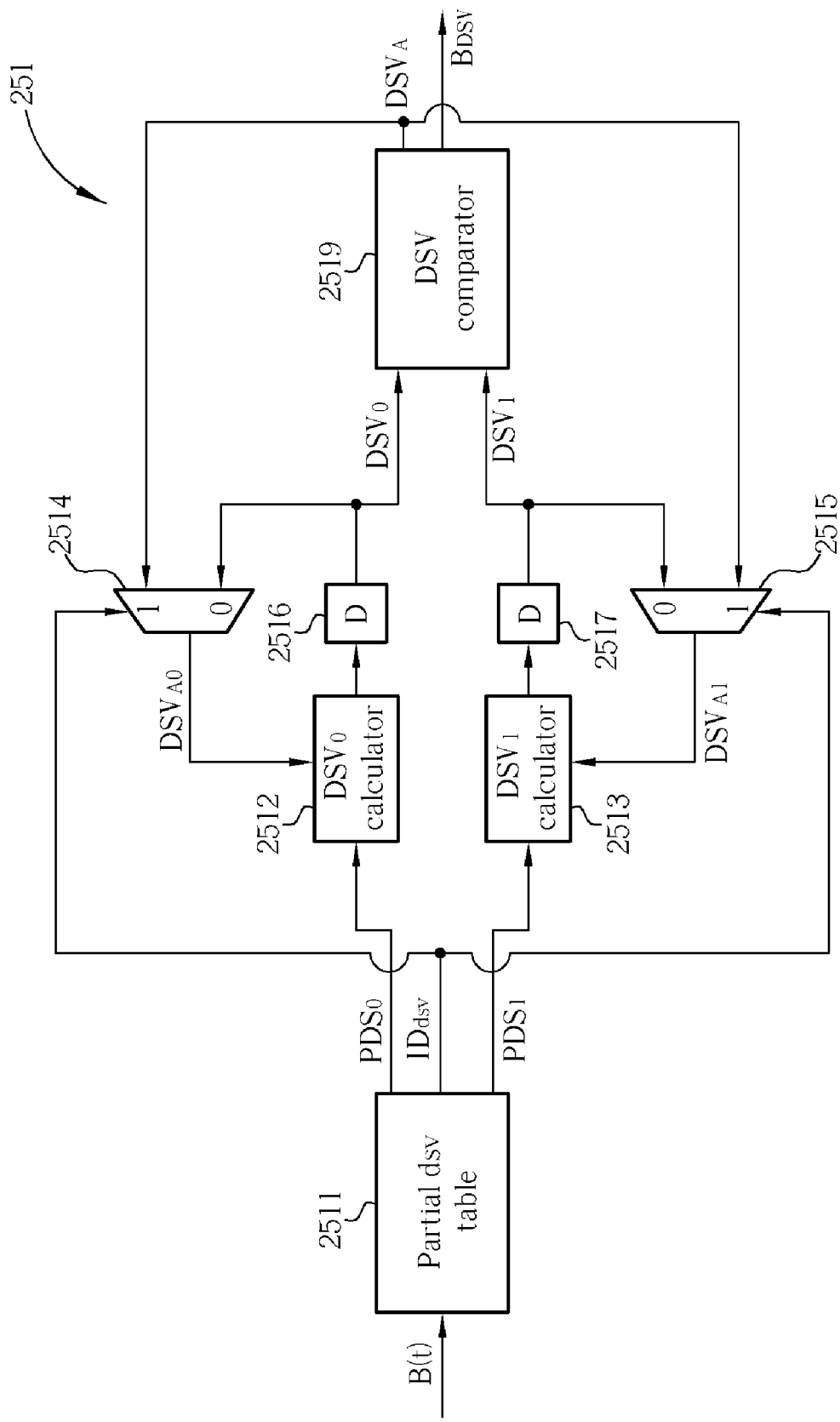
FIG. 11 is a block diagram showing an embodiment of the DSV control bit generator in FIG. 10.

FIG. 11 is a block diagram showing an embodiment 251 of the DSV control bit generator 51 in FIG. 10. Elements 2512–2519 in the DSV control bit generator shown in FIG. 11 are the same as elements 1512–1519 in FIG. 5, thus the description of elements 2512–2519 are omitted. The detailed description of the partial DSV table 2511 will be explained as follows. Since the input of the DSV control bit generator 51 is a signal carrying data words B(t), a partial DSV table 2511 simultaneously maps two partial DSVs, $PSD_0$ and $PSD_1$, and a DSV control bit indicator $ID_{DSV}$ according to the data word B(t). A portion of an exemplary partial DSV table 2511 is shown in FIG. 12. If the data word B(t) does not have any DSV control bit, the value of the DSV control bit indicator $ID_{DSV}$ is 0, and the two partial DSVs, $PSD_0$ and $PSD_1$, generated by the partial DSV generator 1511 are the same. If the data word B(t) has a DSV control bit, the value of the DSV control bit indicator $ID_{DSV}$ is 1, and the two partial DSVs, $PSD_0$ (assuming the current DSV control bit $B_{DSV}$=0) and $PSD_1$ (assuming the current DSV control bit $B_{DSV}$=1), are generated by the partial DSV generator 1511, respectively. Besides, the bit asterisk "*" and code connection rules are also taken into consideration for determination of DSV control bit. An offset value will be added to the partial DSVs when the bit asterisk "*" and code concatenation rules are encountered. The offset value is determined according to the previous, current, and subsequent data words.

Figure 13:
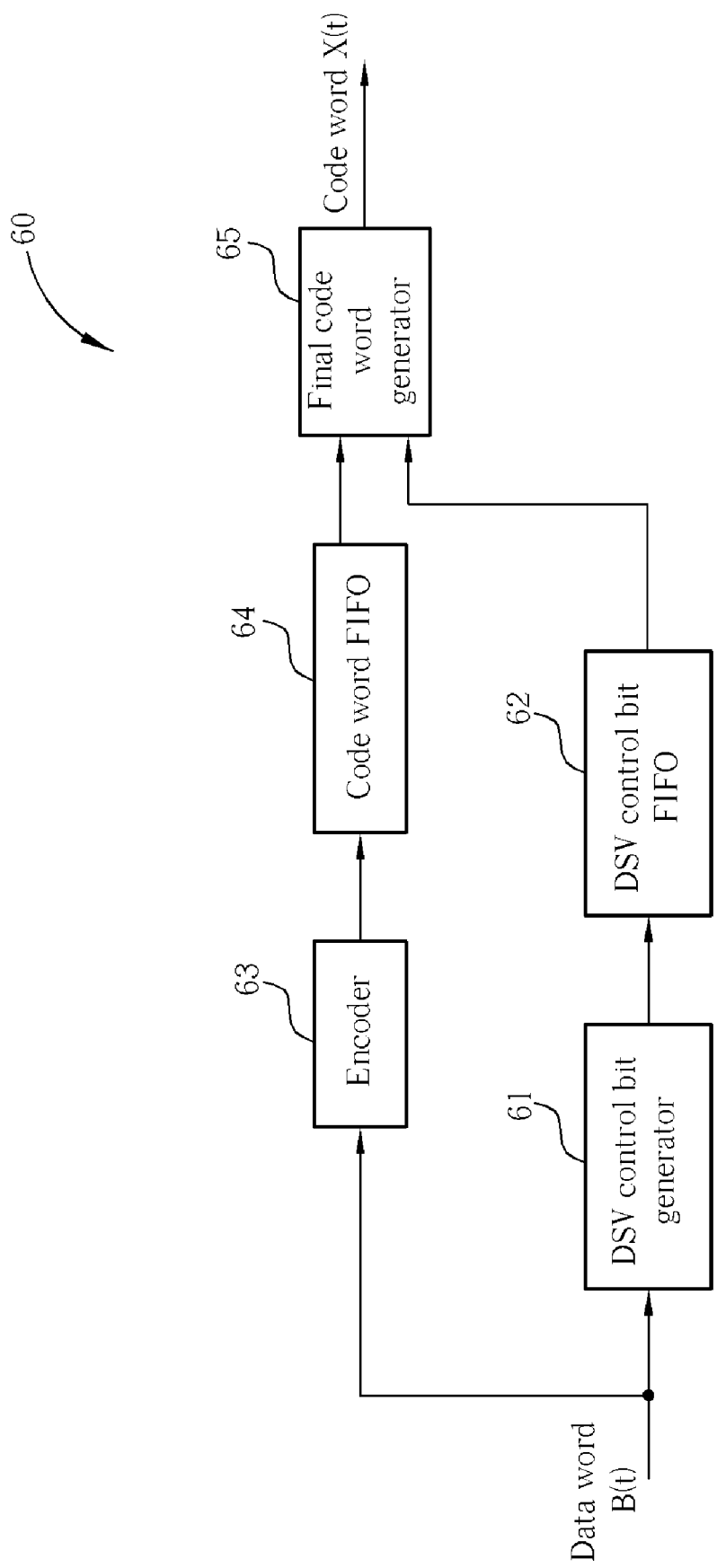
FIGS. 13–14 are functional block diagrams showing embodiments of modulation systems.
Figure 13A:
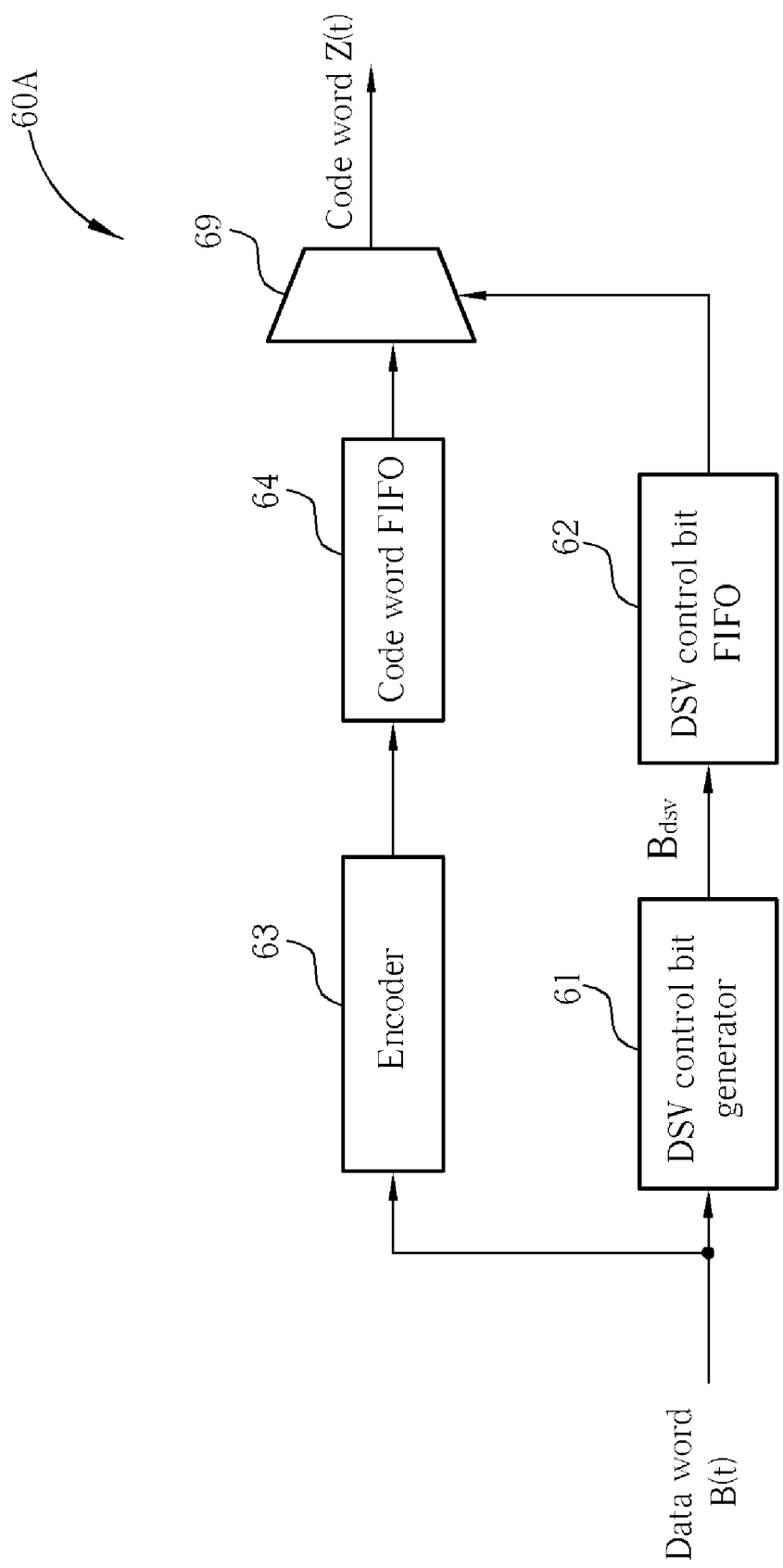

FIG. 13 is a block diagram showing another embodiment of a modulation system 60. In comparison with the modulation system 50, the modulation system 60 encodes the data words B(t) into code words through an encoder 63, and instead of storing the data words, the system 60 stores the code words with undetermined DSV control bits in a code word FIFO 64. Similarly, the data words are provided to a DSV control bit generator 61 for determining DSV control bits, and the determined DSV control bits are temporarily stored in a DSV control bit FIFO 62 waiting to be retrieved by a final code word generator 65. Since the input of the DSV control bit generator 61 in the modulation system 60 is a stream of data words B(t), which is the same as that in the modulation system 50 of FIG. 10, one embodiment of the DSV control bit generator 61 could be the same as the DSV control bit generator 51 in the modulation system 50 as shown in FIG. 11.

FIGS. 8(A), 9(A), 10(A), and 11(A) are based on FIGS. 8, 9, 10, and 11. In these embodiments 70A, 80A, 50A, 60A, a DSV control bit generator determines the DSV control bits according to data words or code words and sequentially outputs the determined DSV control bits to a DSV control bit FIFO. An encoder in the modulation system of these embodiments encodes each data word B(t) into one or more than one different tentative code words depending on whether any DSV control bit exists in the tentative code words. If no DSV control bit exists in the tentative code words, the tentative code words corresponding to a data word B(t) are the same. If a DSV control bit exists in the tentative code words, two different tentative code words corresponds to a data word B(t) are generated for each possible DSV control value. If two DSV control bit exists in the tentative code words, four different tentative code words corresponds to a data word B(t) are generated for each possible value of the two DSV control bits. Finally, the determined DSV control bits output from the DSV control bit FIFO select the corresponding tentative code words as the post-DSV code word Z(t)through a multiplexer 79, 89, 59, 69.

Figure 14:
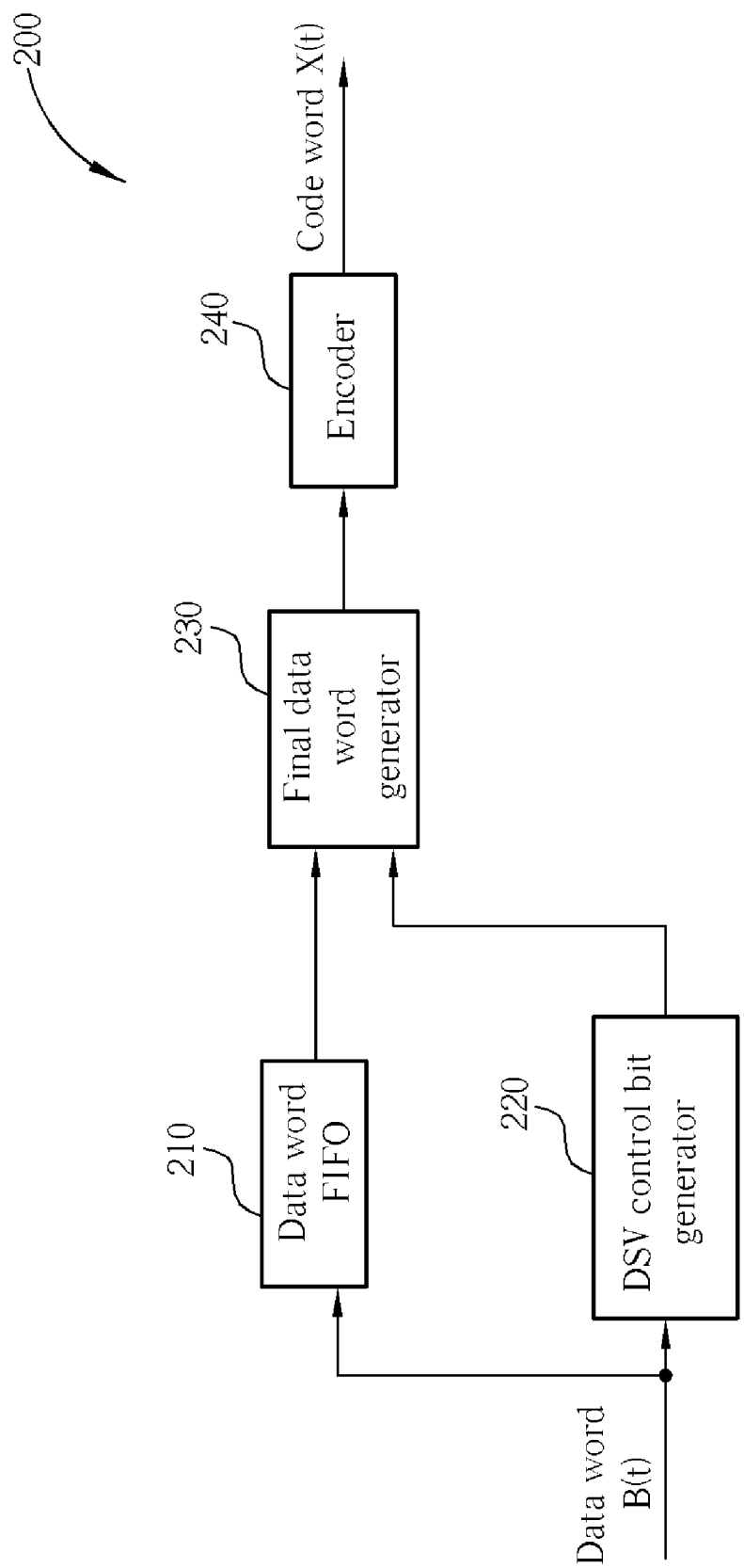
Figure 15:
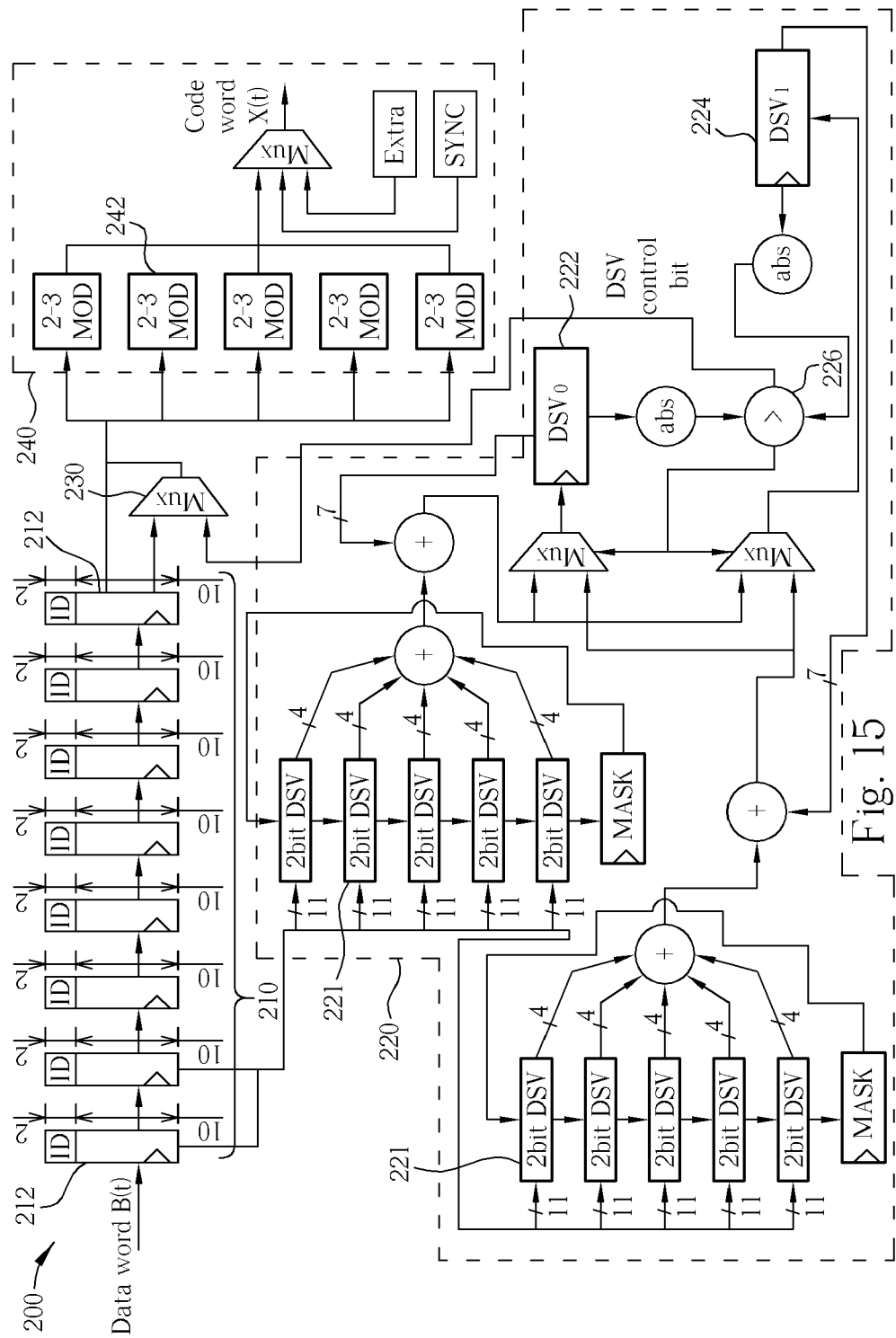
FIG. 15 is a detailed diagram of the embodiment shown in FIG. 14.

For a Blu-ray disc (BD) system, 17 PP modulation is used to convert a data word to a code word from 2-bit to 3-bit. Please refer to FIGS. 14 and 15, which illustrate a 17 PP modulator 200 for use with a Blu-ray disc recorder. A data word B(t) is simultaneously input to a DSV control bit generator 220 and a data word FIFO 210. The data word FIFO 210 stores a plurality of data words 212, where each data word 212 contains a 2-bit ID and 10 bits of data. The 2-bit ID indicates whether a DSV control bit is present in the corresponding 10 bits of data and the location of the DSV control bit. The DSV control bit generator 220 determines a current DSV control bit by calculating two cumulative DSV values 222 and 224 corresponding to a DSV control bit of 0 and 1. The absolute values of the two calculated DSV values 222 and 224 are compared with a comparator 226 to determine which control bit produces the smallest DSV value. In other words, the DSV control bit generator 220 minimizes the absolute cumulative DSV by parallel processing several 2-bit channel bits 221 when detecting at least one subsequent DSV control bit or after a predetermined delay. The buffer size of the data word FIFO 210 determines the predetermined delay used for detecting the DSV control bit since the number of data words that the data word FIFO 210 can store depends on the buffer size of the data word FIFO 210.

In other embodiments, the DSV control bit generator 220 can also use a mapping table to determine the DSV control bit based on the data word. FIG. 16 represents an example of the so-called mapping table that converts data words to partial DSVs. The length of data words in FIG. 16 is not constant, so that the effect of a 2-bits data word may have already been calculated in the previous operation of transferring a data word to the DSV value according to the mapping table in FIG. 16. The effect of a 2-bits data word to the DSV should be ignored if it had been calculated in the previous operation, otherwise the effect should be added into the DSV calculation. The MASK signal is used to indicate whether a 2-bits data word is effective or not. By using a mapping table such as the tables previously mentioned, the cumulative DSV can be calculated by searching for corresponding values using the data words. Afterward, the original DSV control bit of a data word is modified by the DSV control bit determined by the DSV control bit generator 220 by a final data word generator 230, which is shown as a multiplexer in FIG. 15. The data words combined with the determined DSV control bit are modulated into code words X(t) by an encoder 240 in parallel. The parallel modulation utilizes a plurality of modulators 242, and means that several 2-bit channel bits of the data word B(t) are simultaneously converted into 3-bit modulated bits of the code words X(t). FIG. 17 shows an example implementation of the encoder 240 for the conversion from data word to code word.

Figure 18:
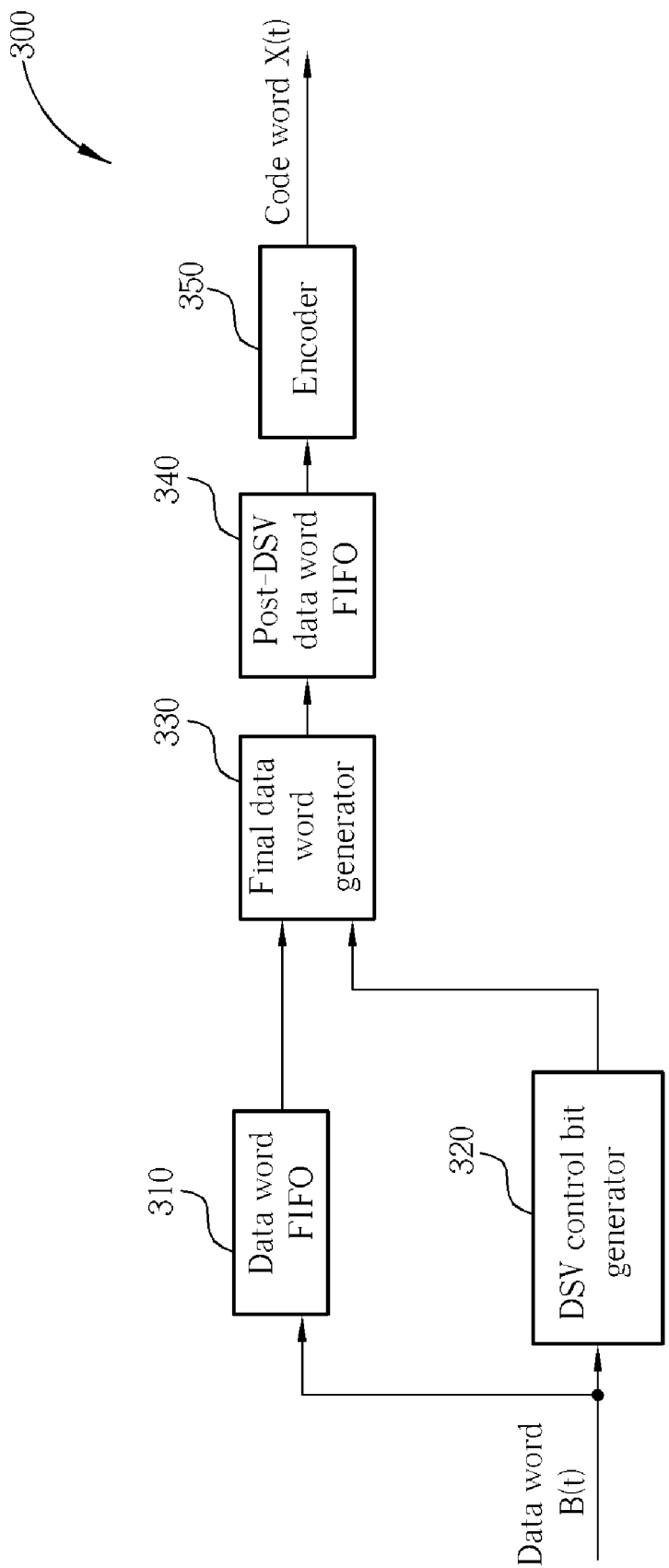
FIG. 18 is a functional block diagram showing an embodiment of a modulation system.
Figure 19:
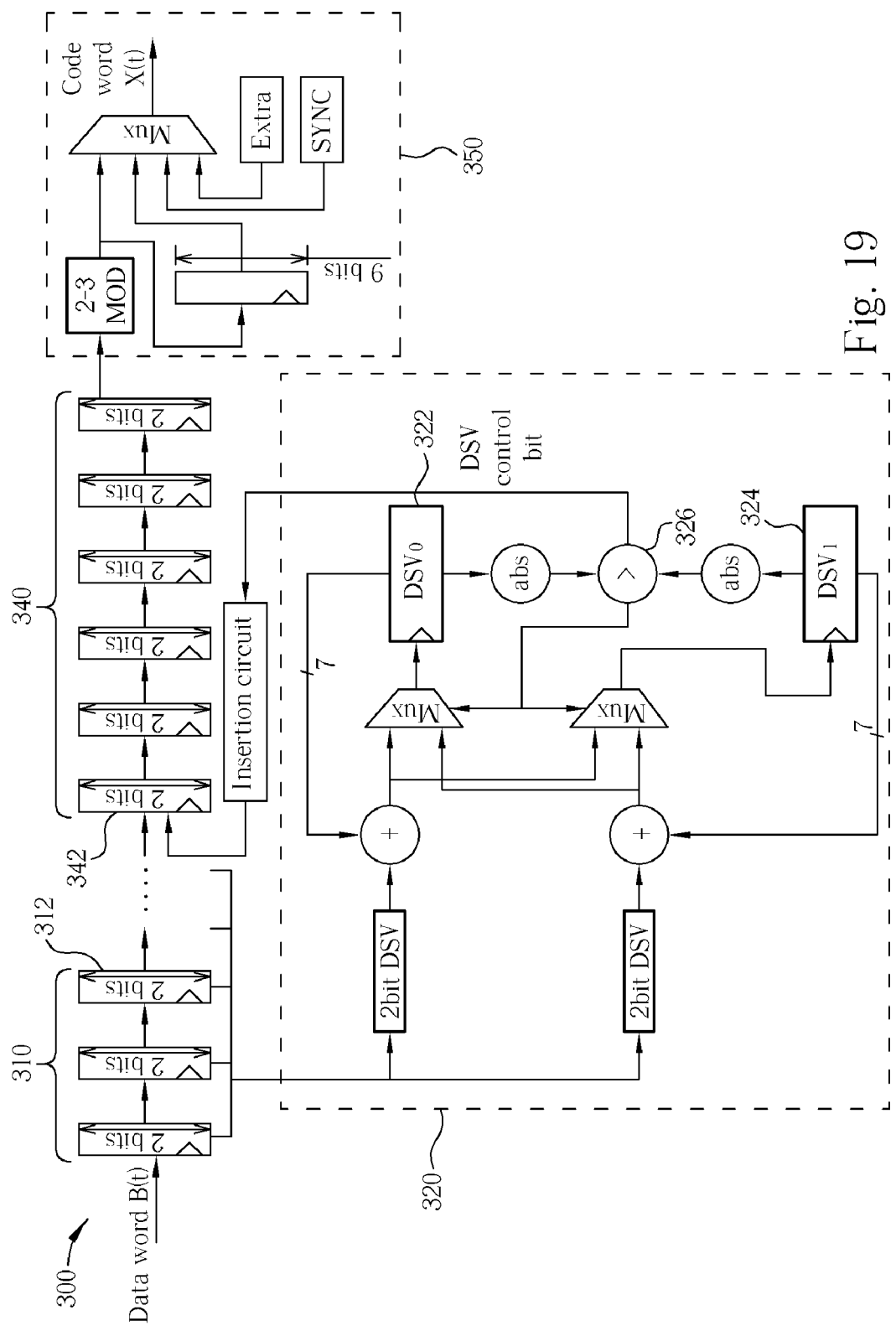
FIG. 19 is a detailed diagram of the embodiment shown in FIG. 18.

Please refer to FIGS. 18 and 19, which illustrate a 17 PP modulator 300 for serial processing data. As shown in FIG. 18, a data word B(t) is simultaneously input into a DSV control bit generator 320 and a data word FIFO 310. The data word FIFO 310 stores a plurality of sequential 2-bit channel bits 312 of the data word B(t). The DSV control bit generator 320 determines a current DSV control bit by calculating two cumulative DSV values 322 and 324 corresponding to a DSV control bit of 0 and 1. The absolute values of the two calculated DSV values 322 and 324 are compared with a comparator 326 to determine which control bit produces the smallest DSV value. In other words, the DSV control bit generator 320 minimizes the absolute cumulative DSV by serially processing sequential 2-bit channel bits 321 when detecting at least one subsequent DSV control bit. Afterward, a determined DSV control bit is inserted into a corresponding data word by a final data word generator 330. The data words combined with the determined DSV control bit are temporally buffered in a post-DSV data word FIFO 340. An encoder 350 serially reads the data words 342 from the post-DSV data word FIFO 340 for encoding them into code words X(t) channel-bit to channel-bit.

Figure 20:
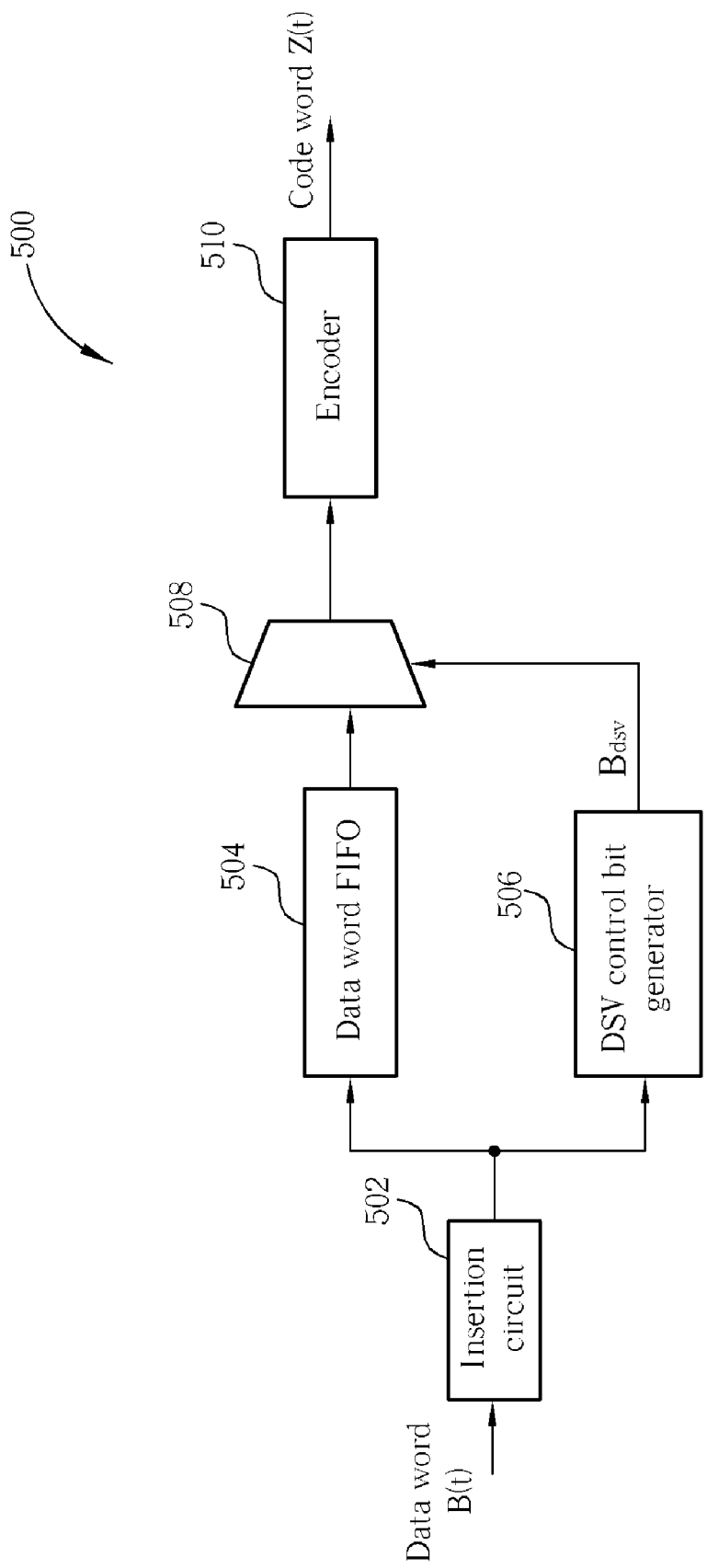
FIGS. 20 to 21 are functional block diagrams showing embodiments of modulation systems.
Figure 21:
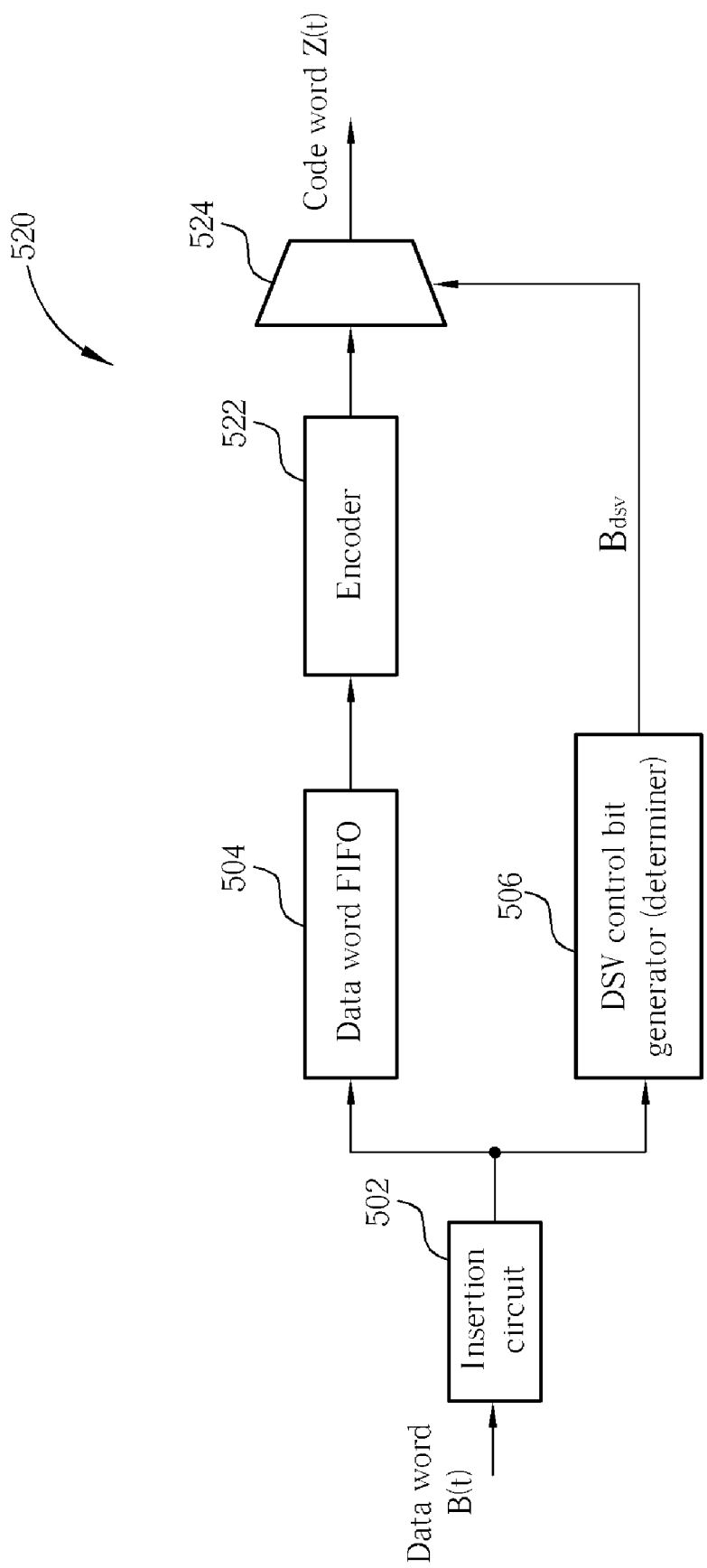

Please refer to FIG. 20 and FIG. 21, which illustrate embodiments 500, 520 of modulation systems. The embodiments 500, 520 can make use of either serial or parallel implementations, such as the parallel implementation shown in FIG. 14 and the serial implementation shown in FIG. 18.

In these embodiments, an insertion circuit 502 inserts each DSV control bit into the corresponding positions within the stream of the data words. Because each DSV control bit has two possible values, 0 and 1, two different streams of data words corresponding to each possible value of a DSV control bit are produced after the insertion circuit 502. The two different streams of data words are provided to a data word FIFO 504 and a DSV control bit generator (determiner) 506 for determining each DSV control bit within the two different streams of data words. In the embodiment of FIG. 20, the determined DSV control bit selects a corresponding data word stream for encoding. The DSV control bit selects the corresponding data word through a multiplexer 508, and an encoder 510 encodes the result. In the embodiment of FIG. 21, an encoder 522 modulates the two streams of data words stored in the data word FIFO 504 into two respective streams of code words. Then, the determined DSV control bit uses multiplexer 524 to select a corresponding stream of code words as the post-DSV code word Z(t).

Figure 22:
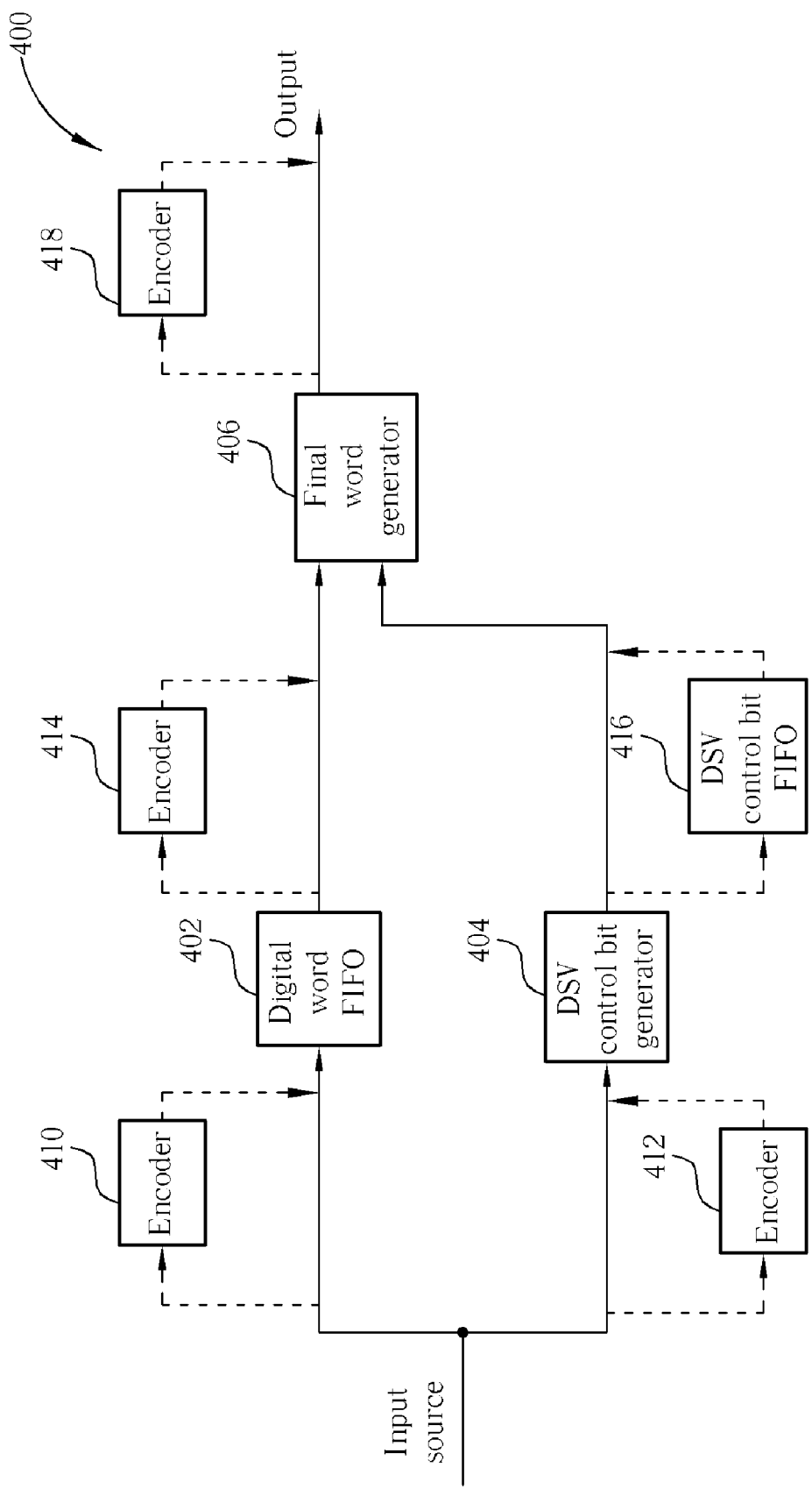
FIG. 22 is a summarized structural diagram of a modulation system.

Please refer to FIG. 22, which is a summarized structural diagram of a modulation system 400 according to the above disclosure. In the modulation system 400, blocks 402–406 represent required blocks and blocks 410–418 represent optional ones. A digital word FIFO 402 may store either data words or tentative code words, and the input source may be data words or tentative code words. Similarly, the source of the DSV control bit generator 404 may be data words or tentative code words. Final word generator 406 may generate either final data words or final code words as output by either modifying, replacing, inserting, or selecting the final word according to DSV control bits determined by the DSV control bit generator 404.

For the optional units, one or more encoders 410, 412, 414, 418 may be placed in many possible positions, and it is also possible that multiple encoders are included in the system. A DSV control bit FIFO 416 can be included in some embodiments, whereas in some other embodiments, the DSV control bit may be directly transferred to the final word generator 406 without the FIFO, for example, by knowing where to insert/modify the DSV control bit by calculating its position.

Certain terms are used throughout the following description and claims to refer to particular system components. As one skilled in the art will appreciate, consumer electronic equipment manufacturers may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or direct electrical connection. Thus, if a first device couples to a second device, that connection may be through a direct electrical connection, or through an indirect electrical connection via other devices and connections.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A modulation system, comprising:
   an encoder, transferring data words to tentative code words;
   a DSV control bit generator, determining the value of a DSV control bit according to the data words or the tentative code words to optimize the cumulative DSVs corresponding possible tentative code words, wherein the DSV control bit generator determines the value of a current DSV control bit which minimizes the absolute cumulative DSV when at least a subsequent DSV control bit is detected or after a predetermined delay; and
   a final code word generator, generating final code words according to the determined DSV control bit and the tentative code words.

2. A modulation system, comprising:
an encoder, transferring data words to tentative code words;
a partial DSV generator, generating partial digital sum values (DSVs) according to the data words or tentative code words;
a DSV accumulator, cumulating the partial DSVs as cumulative DSVs for possible values of a DSV control bit;
a DSV control bit generator, determining the value of a DSV control bit according to the cumulative DSVs, wherein the DSV control bit generator determines the value of a current DSV control bit which minimizes the absolute cumulative DSV when at least a subsequent DSV control bit is detected or after a predetermined delay; and
a final code word generator, generating final code words according to the determined DSV control bit and the tentative code words.

3. The modulation system according to claim 2, further comprising a storage device for storing the data words or the tentative code words.

4. The modulation system according to claim 3, further comprising a DSV control bit buffer storing the DSV control bit determined by the DSV control bit generator.

5. The modulation system according to claim 4, wherein the DSV control bit buffer stores an arbitrary value as the DSV control bit for a data word if no DSV control bit is included in the data word, and the final code word generator ignores the arbitrary value while generating the code word corresponding to the data word without the DSV control bit.

6. The modulation system according to claim 2, wherein the encoder performs code conversion and code connection to prevent generating invalid code words.

7. The modulation system according to claim 6, wherein the encoder generates a pre-connection code word for each data word and a corresponding state according to a conversion table, and each tentative code word is generated based on the corresponding pre-connection code word.

8. The modulation system according to claim 2, wherein the DSV accumulator calculates the cumulative DSVs corresponding to the code words between at least two successive DSV control bits.

9. The modulation system according to claim 2, wherein the partial DSV generator and the encoder arranges the data words in parallel or in series for calculating the partial DSVs and transferring the data words into the tentative code words respectively.

10. The modulation system according to claim 2, wherein the predetermined delay is defined by a period of time or a number of data bits.

11. The modulation system according to claim 2, further comprising:
a DSV location determiner notifying the final code word generator locations of the DSV control bit in the tentative code words;
wherein the final code word generator modifies the locations in the tentative code words according to the determined DSV control bits.

12. A modulation system, comprising:
a data word to partial DSV transferring circuit, generating partial DSVs according to data words;
a DSV accumulator, cumulating the partial DSVs as cumulative DSVs for possible values of a DSV control bit;
a DSV control bit generator, determining the value of a DSV control bit according to the cumulative DSVs, wherein the DSV control bit generator determines the of a current DSV control bit which minimizes the absolute cumulative DSV when at least a subsequent DSV control bit is detected or after a predetermined delay;
a final data word generator, generating a final data word according to the result of the DSV control bit and the data word; and
an encoder to transfer the final data words to final code words.

13. The modulation system according to claim 12, further comprising a data word storage device for storing the data words or the final data words in a first in first out (FIFO) manner.

14. The modulation system according to claim 12, further comprising a DSV control bit buffer storing the DSV control bit determined by the DSV control bit generator in a FIFO manner.

15. The modulation system according to claim 14, wherein the DSV control bit buffer stores an arbitrary value as the DSV control bit for a data word if no DSV control bit is included in the data word, and the final code word generator ignores the arbitrary value while generating the code word corresponding to the data word without the DSV control bit.

16. The modulation system according to claim 12, wherein the encoder and the data word to partial DSV transferring circuit arranges the data words in parallel or in series for transferring the final data words into the final code words and calculating the partial DSVs respectively.

17. The modulation system according to claim 12, wherein the predetermined delay is defined by a period of time or a number of data bits.

18. The modulation system according to claim 12, further comprising:
a DSV location determiner notifying the final data word generator locations of the DSV control bit in the data words;
wherein the final data word generator generates the final data words by modifying the locations in the data words according to the determined DSV control bits.

19. A modulation system, comprising:
a partial DSV generator, generating partial DSVs of code words corresponding to data words;
a DSV accumulator, for cumulating partial DSVs as cumulative DSVs;
a DSV control bit generator, determining the value of a DSV control bit according to the cumulative DSVs, wherein the DSV control bit generator determines the value of a current DSV control bit which minimizes the absolute cumulative DSV when at least a subsequent DSV control bit is detected or after a predetermined delay; and
a DSV control bit buffer, storing the result of the determined DSV control bit.

20. The modulation system according to claim 19, further comprising a first encoder transferring the data words to tentative code words.

21. The modulation system according to claim 20, further comprising a final code word generator, generating, final code words by modifying the tentative code words according to the determined DSV control bit stored in the DSV control bit buffer.

22. The modulation system according to claim 21, further comprising:

a data word storage device, storing the data words;
wherein the first encoder, encoding the data words output from the data word storage device to generate tentative code words; and the tentative code words is provided to the final code word generator.

23. The modulation system according to claim 22, further comprising:
a second encoder, encoding the data words before stored to the data word storage device to generate second tentative code words;
wherein the second encoder provides the second tentative code words to the partial DSV generator.

24. The modulation system according to claim 21, further comprising:
a code word storage device, storing the tentative code words; and the stored tentative code words is provided to the final code word generator.

25. The modulation system according to claim 20, wherein the partial DSV generator processes the tentative code words in parallel or in series for calculating the partial DSVs.

26. The modulation system according to claim 19, further comprising a data word storage device for storing the data words in a first in first out (FIFO) manner.

27. The modulation system according to claim 19, wherein the partial DSV generator processes the data words in parallel or in series for calculating the partial DSVs.

28. The modulation system according to claim 21, wherein the predetermined delay is defined by a period of time or a number of data bits.

29. A modulation system, comprising:
a partial DSV generator, generating partial DSVs of code words corresponding to data words;
a DSV accumulator, cumulating partial DSVs as cumulative DSVs;
a DSV control bit generator, determining the value of a DSV control bit according to the cumulative DSVs, wherein the DSV control bit generator determines the value of a current DSV control bit which minimizes the absolute cumulative DSV when at least a subsequent DSV control bit is detected or after a predetermined delay; and
a data word buffer, buffering a plurality of data words.

30. The modulation system according to claim 29, further comprising:
an encoder, generating code words according to the data words and the determined DSV control bits.

31. The modulation system according to claim 29, further comprising:
an encoder, generating code words according to the data words.

32. The modulation system according to claim 31, wherein the encoder performs code conversion and code connection to prevent generating invalid code words.

33. The modulation system according to claim 31, wherein the encoder process the data words in parallel or in series.

34. The modulation system according to claim 29, further comprising a DSV control bit buffer storing the DSV control bit determined by the DSV control bit generator in a FIFO manner.

35. The modulation system according to claim 34, further comprising:
a final word generator, generating a final word according to the result of the DSV control bit and the data words stored in the data word buffer.

36. The modulation system according to claim 32, wherein the predetermined delay is defined by a period of time or a number of data bits corresponding to the capacity of the data word buffer.

37. A modulation method, comprising the steps of:
modulating a plurality of data words into a plurality of tentative code words by performing code conversion and code connection to prevent generating invalid code words;
calculating a cumulative digital sum value (DSV) from the data words or tentative code words for each possible value of a DSV control bit;
determining the DSV control bit which minimizes the absolute cumulative DSV when at least one subsequent DSV control bit is detected or after a predetermined delay; and
generating final code words by modifying the DSV control bit in the tentative code word according to the determined DSV control bit.

38. The modulation method according to claim 37, further comprising storing the data words or tentative code words in a first in first out (FIFO) manner for modulation.

39. The modulation method according to claim 37, further comprising storing the determined DSV control bit in a FIFO manner waiting for final code word generation.

40. The modulation method according to claim 39, further comprising the steps of:
storing an arbitrary value as the DSV control bit for a data word or a tentative code word if no DSV control bit is included in the data word or a tentative code word; and
ignoring the arbitrary value rather than modifying the DSV control bit of the data word or the tentative code word with the arbitrary value.

41. The modulation method according to claim 37, further comprising processing the data words in parallel or in series for cumulative DSV calculation and modulation.

42. A system for DSV control bit determination, comprising:
a data word to partial DSV transferring circuit, generating partial digital sum values (DSV) of code words corresponding to data words by referring to the data words;
a DSV accumulator, cumulating the partial DSVs as cumulative DSVs for possible values of a DSV control bit; and
a DSV control bit generator, determining the value of a DSV control bit according to the cumulative DSVs, wherein the DSV control bit generator determines the value of a current DSV control bit which minimizes the absolute cumulative DSV when at least a subsequent DSV control bit is detected or after a predetermined delay.

* * * * *